(12) United States Patent
Choi et al.

(10) Patent No.: US 11,069,025 B2
(45) Date of Patent: Jul. 20, 2021

(54) METHOD FOR TRANSMITTING AND RECEIVING METADATA OF OMNIDIRECTIONAL IMAGE

(71) Applicant: Samsung Electronics Co., Ltd., Suwon-si (KR)

(72) Inventors: Byeong-Doo Choi, Suwon-si (KR); Eric Yip, Seoul (KR); Jae-Yeon Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/998,654

(22) PCT Filed: Feb. 17, 2017

(86) PCT No.: PCT/KR2017/001791
§ 371 (c)(1),
(2) Date: Aug. 16, 2018

(87) PCT Pub. No.: WO2017/142355
PCT Pub. Date: Aug. 24, 2017

(65) Prior Publication Data
US 2019/0197661 A1    Jun. 27, 2019

Related U.S. Application Data

(60) Provisional application No. 62/340,683, filed on May 24, 2016, provisional application No. 62/296,351, filed on Feb. 17, 2016.

(51) Int. Cl.
| | | |
|---|---|---|
| *G06T 3/00* | (2006.01) | |
| *G06T 17/10* | (2006.01) | |
| *H04N 21/84* | (2011.01) | |
| *H04N 21/81* | (2011.01) | |

(Continued)

(52) U.S. Cl.
CPC ............ *G06T 3/0037* (2013.01); *G06T 17/10* (2013.01); *H04N 9/31* (2013.01); *H04N 21/816* (2013.01); *H04N 21/84* (2013.01); *H04N 19/597* (2014.11)

(58) Field of Classification Search
CPC ..... G06T 3/0037; G06T 17/10; G06T 3/0018; G06T 7/80; G06T 2200/32; G06T 19/00;
(Continued)

(56) References Cited

U.S. PATENT DOCUMENTS 8,982,154 B2 *   3/2015   Vincent ................... G06T 17/05
                                                        345/419
2001/0015751 A1    8/2001   Geng
(Continued)

OTHER PUBLICATIONS

Byeongdoo Choi et al., "Use Cases and Requirements of Omnidirectional Media Fomat", XP030065412, Geneva Switzerland.
(Continued)

*Primary Examiner* — Jennifer Mehmood
*Assistant Examiner* — Andrew Shin
(74) *Attorney, Agent, or Firm* — Jefferson IP Law, LLP

(57) ABSTRACT

The present disclosure relates to a method for transmitting metadata of an omnidirectional image by a transmission apparatus, the method comprising the steps of: projecting an omnidirectional image into a planar image based on a 3-dimensional (3D) geometry corresponding to the omnidirectional image; and transmitting metadata including type information of the 3D geometry, information for a region on the projected planar image, and information for an area on the omnidirectional image which is mapped to the region.

15 Claims, 19 Drawing Sheets

(51) Int. Cl.
*H04N 9/31* (2006.01)
*H04N 19/597* (2014.01)

(58) Field of Classification Search
CPC .......... G06T 19/20; G06T 2207/10016; G06T 3/0043; G06T 3/0062; G06T 15/205; G06T 15/00; G06T 15/10; H04N 21/816; H04N 21/84; H04N 19/597; H04N 5/23238; H04N 9/31; G03B 37/00
See application file for complete search history.

(56) References Cited

U.S. PATENT DOCUMENTS

| | | |
|---|---|---|
| 2002/0141659 A1 | 10/2002 | Florin et al. |
| 2006/0034523 A1 | 2/2006 | Park |
| 2006/0257049 A1* | 11/2006 | Lelescu ................ G06T 3/0018 |
| | | 382/276 |
| 2012/0313938 A1 | 12/2012 | Mohajerin |
| 2014/0085412 A1* | 3/2014 | Hayashi ................ G06T 11/60 |
| | | 348/37 |
| 2015/0350542 A1 | 12/2015 | Steuart, III |

OTHER PUBLICATIONS

Shinya Shimizu et al., "Use Cases and Requirements on Free-viewpoint Television (FTV) v.2", XP030022415, Geneva, Switzerland.

European Search Report dated Jan. 24, 2019, issued in European Patent Application No. 17753516.8.

* cited by examiner

METHOD FOR TRANSMITTING AND RECEIVING METADATA OF OMNIDIRECTIONAL IMAGE

CROSS-REFERENCE TO RELATED APPLICATION(S)

This application is a National Phase Entry of PCT International Application No. PCT/KR2017/001791, which was filed on Feb. 17, 2017, and which claims priority under 35 U.S.C. § 119(e) of US Provisional Patent Applications Nos. 62/296,351 filed on Feb. 17, 2016, and 62/340,683 filed on May 24, 2016, in the US Patent and Trademark Office, the disclosure of each of which is incorporated herein by reference in its entirety.

TECHNICAL FIELD

The present disclosure generally relates to a method for transmitting and receiving omnidirectional media and metadata, and more particularly, to metadata for transmitting, receiving, and reconstructing omnidirectional media, such as Virtual Reality (VR) content, mobile VR content, and a 360-degree image, and a method and an apparatus for transmitting and receiving the same.

BACKGROUND ART

Consumer media content continues to evolve from black-and-white content to color content, High-Definition (HD) content, and Ultra-High-Definition (UHD) content. In recent years, high-Dynamic-Range (HDR) content has been standardized, and specifications for HDR content have been prepared. The International Organization for Standardization/International Electrotechnical Commission (ISO/IEC) 23000 specifies a file format designed to store, exchange, manage, edit, and present image content based on ISO Base Media File Format (ISO BMFF).

For example, VR media content captured by a video camera may be mastered by a mastering device, may be encoded/multiplexed by an encoding/multiplexing (Mux) device, and may be distributed as VR content in various media formats. The distributed VR content may be decoded/demultiplexed (Demux) at a receiver, may be transmitted to a display device, and may be VR-displayed.

VR content is significantly different in property from conventional two-dimensional (2D) or three-dimensional (3D) content. VR content provides a user with an entire 360-degree view, enabling the user to have an immersive experience.

VR content was in the incubation phase until VR devices were distributed. However, as 360-degree cameras and VR devices are commercialized, omnidirectional media, such as a 360-degree image, are used in a wide range of fields. However, a file format for transmission and reception of omnidirectional media has not yet been standardized.

DETAILED DESCRIPTION OF THE INVENTION

Technical Problem

The present disclosure specifies a file format that enables storage, exchange, management, edition, and presentation of content. For example, in the present disclosure, image content based on ISO Base Media File Format (ISO BMFF) will be illustrated, and the overall structure of the file format that stores omnidirectional content along with projection-related information will be provided.

According to the present disclosure, metadata provides an overall method for storing omnidirectional media along with projection-related information.

Technical Solution

The present disclosure proposes a method for transmitting, by a transmission apparatus, metadata of an omnidirectional video, the method including: projecting an omnidirectional video onto a planar video based on a three-dimensional (3D) geometry corresponding to the omnidirectional video; and transmitting metadata including type information of the 3D geometry, information for a region on the projected planar video, and information for an area on the omnidirectional video which is mapped to the region.

The present disclosure proposes a method for receiving, by a reception apparatus, metadata of an omnidirectional video, the method including: receiving metadata including type information of a 3D geometry corresponding to an omnidirectional video, information for a region on a planar video, and information for an area on the omnidirectional video which is mapped to the region; projecting the planar video onto the 3D geometry corresponding to the omnidirectional video.

The present disclosure proposes a transmission apparatus for transmitting metadata of an omnidirectional video, the apparatus including: a controller configured to project an omnidirectional video onto a planar video using a 3D geometry corresponding to the omnidirectional video; and a transceiver configured to transmit metadata including type information of the 3D geometry, information for a region on the projected planar video, and information for an area on the omnidirectional video which is mapped to the region.

The present disclosure proposes a reception apparatus for receiving metadata of an omnidirectional video, the apparatus including: a transceiver configured to receive metadata including type information of a 3D geometry corresponding to an omnidirectional video, information for a region on a planar video, and information for an area on the omnidirectional video which is mapped to the region; a controller configured to project the planar video onto the omnidirectional video using the 3D geometry corresponding to the omnidirectional video.

Advantageous Effects

According to the present disclosure, by using metadata, a transmitting side may map an omnidirectional video to a planar video to transmit the omnidirectional video, and a receiving side may reconstruct an omnidirectional video from a planar video to render the omnidirectional video.

MODE FOR CARRYING OUT THE INVENTION

Hereinafter, embodiments of the present disclosure will be described in detail with reference to the accompanying drawings. In the following description of the present disclosure, a detailed description of known configurations or functions incorporated herein will be omitted when it is determined that the detailed description may make the subject matter of the present disclosure unclear. The terms as described below are defined in consideration of the functions in the embodiments, and the meaning of the terms may vary according to the intention of a user or operator, convention, or the like. Therefore, the definitions of the terms should be made based on the contents throughout the specification.

In the detailed description of the present disclosure, an example of interpretable meanings of some terms used in the present disclosure is proposed. However, it is noted that the terms are not limited to the examples of the construable meanings which are proposed below.

A base station is a subject communicating with a User Equipment (UE), and may be referred to as a BS, a Node B (NB), an evolved Node B (eNB), an Access Point (AP) or the like.

The user equipment is a subject communicating with the BS, and may be referred to as a UE, a Mobile Station (MS), a Mobile Equipment (ME), a device, a terminal or the like.

Omnidirectional media may also be referred to as omnidirectional content, an omnidirectional video, 360-degree media, 360-degree content, a 360-degree video, VR media, VR content, or a VR video.

Figure 1A:
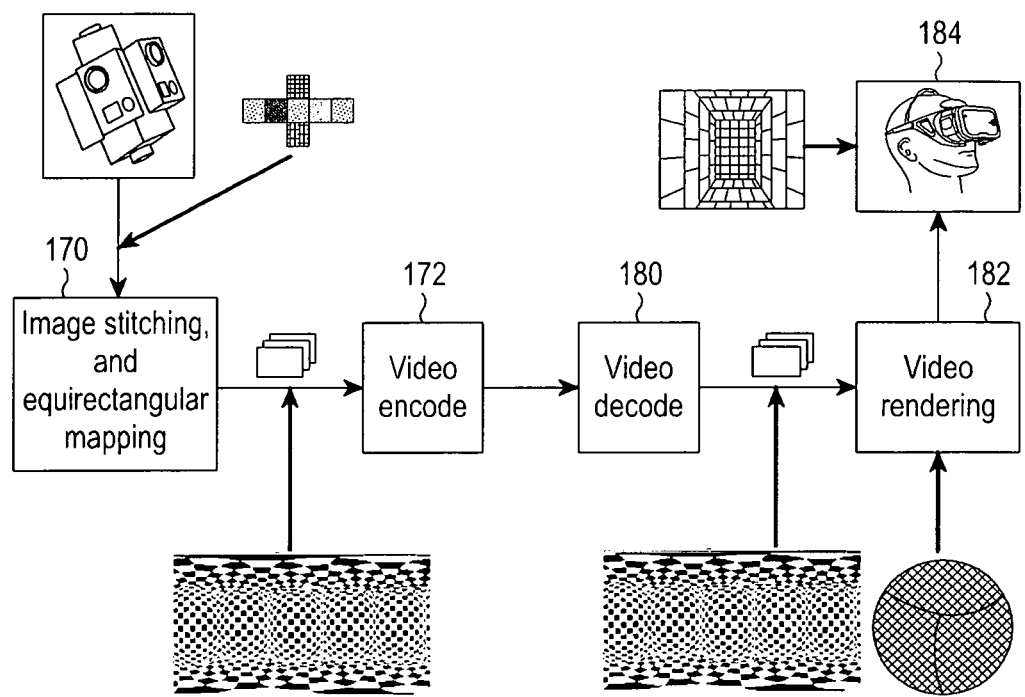
FIGS. 1A and 1B illustrate an operation of a transmitting side encoding and transmitting an omnidirectional video and an operation of a receiving side receiving and reconstructing an omnidirectional video according to the present disclosure.

FIG. 1A illustrates an operation of a transmitting side encoding and transmitting an omnidirectional video and an operation of a receiving side receiving and reconstructing an omnidirectional video according to the present disclosure.

An overall process for omnidirectional (360-degree) content may be illustrated, for example, in FIG. 1A. Generally, a 360-degree view may be captured using a plurality of cameras. Images from the plurality of cameras may be aligned and stitched together and may be mapped into a single image (170). The image or video may be encoded (172) and stored. A file generator for an omnidirectional Media Application Format (MAF) accepts omnidirectional media content including video, audio, and metadata streams. Any metadata for converting a projected 2D image into a sphere 3D image may be included in the stream.

At the receiving side, when the stream is fed into a file parser, a 3D model and projection metadata may be parsed and are shared with a 3D projector. Also, the 2D image or video may be decoded (180). The 3D projector may render the decoded 2D image or video into a 360-degree image or video (182) by mapping the decoded 2D image or video onto the surface of a particular 3D model using the shared projection metadata. A specific view from the entire 360-degree image or video may be extracted and may be displayed (184) on a Head-Mounted Display (HMD) or other display devices (e.g., a mobile phone or a tablet PC).

Figure 1B:
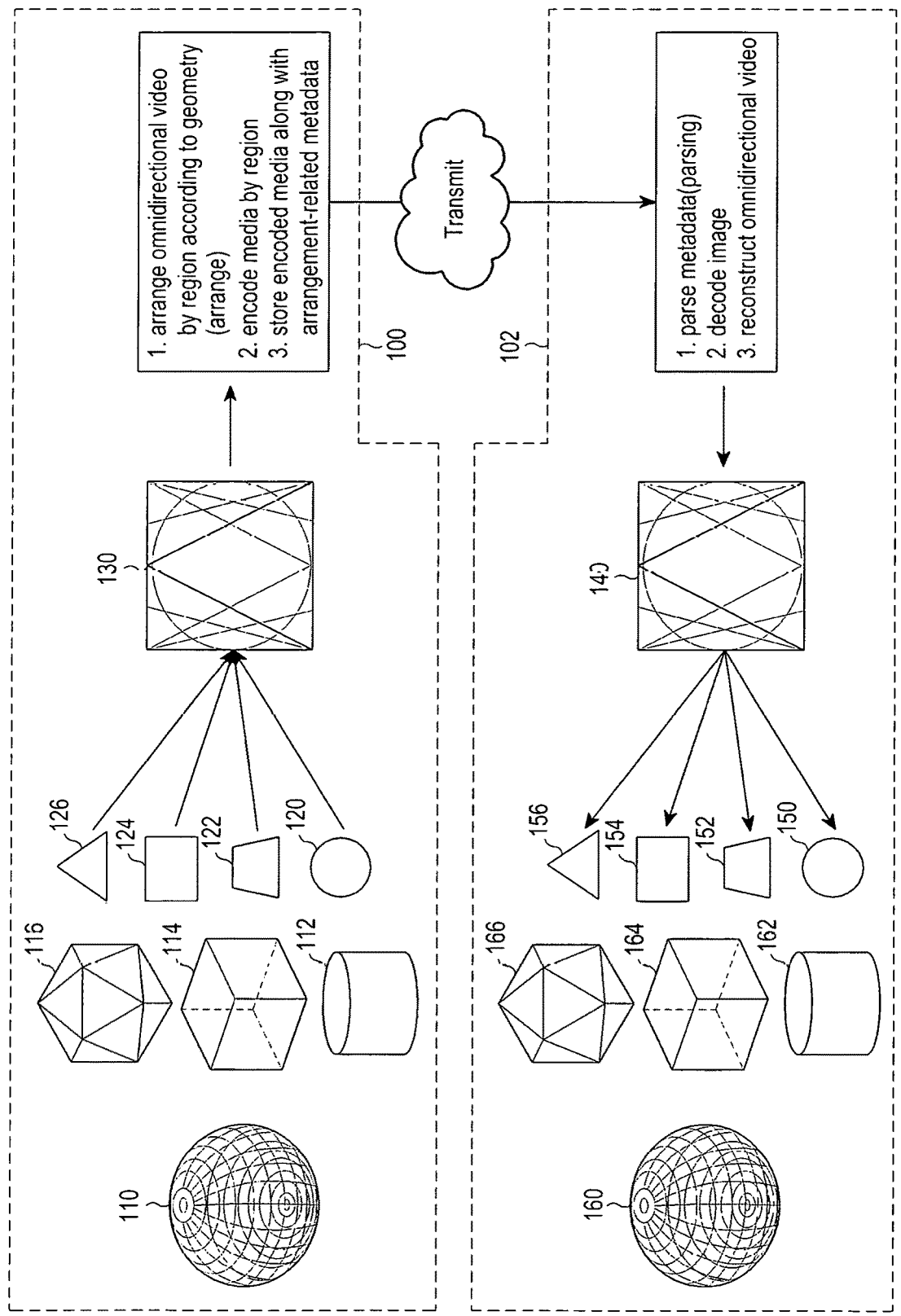

FIG. 1B illustrates in detail an operation of a transmitting side encoding and transmitting an omnidirectional video and an operation of a receiving side receiving and reconstructing an omnidirectional video according to the present disclosure.

At the transmitting side 100, an omnidirectional video (360-degree video) may be presented through a 3D geometry (3D geometric structure, which is hereinafter referred as a "geometry"). The geometry may be various shapes. For example, the geometry may be a sphere 110, a cylinder 112, a platonic solid, a pyramid, a truncated pyramid, and the like. The platonic solid may include a tetrahedron, a cube or hexahedron 114, an octahedron, a dodecahedron, and an icosahedron 116. Platonic solids except for a cube with square surfaces and a dodecahedron with regular pentagonal surfaces have equilateral triangular surfaces.

The entirety or part of the omnidirectional video presented through the geometry is referred to as a patch in the present disclosure. For example, the surfaces may be a patch. The patch is fitted to a unit area used for rendering the omnidirectional video. That is, the omnidirectional video may be encoded and transmitted in one or more areas by the transmitting side 100, and the transmitted one or more areas may be decoded and then rendered (reconstructed as a geometry) and reproduced as an omnidirectional image by the receiving side 102. Thus, in the present disclosure, the patch (or surface) fitted to the video may also be referred to as a patch (or surface) mapped to the video. Here, a patch refers to a separate unit of the omnidirectional video and may also be referred to as a surface, a tile, or a cell.

The patch may be variously determined depending on the geometry type. For example, when the geometry is a sphere, the sphere may have a single patch in a rectangular shape 124 by equirectangular projection. When the geometry is a cylinder, the cylinder may have, as patches, a top surface and a bottom surface in a circular shape 120 and one side surface in a square shape 124. When the geometry is a platonic solid, the platonic solid may have, as patches, surfaces in a triangular shape 126 (when the geometry is a tetrahedron, an octahedron, or an icosahedron), in a square shape 124 (when the geometry is a cube) or in a pentagonal shape (when the geometry is a dodecahedron). When the geometry is a pyramid, the pyramid may have, as patches, a bottom surface in a square shape 124 and four side surfaces in a triangular shape 126. When the geometry is a truncated pyramid, the truncated pyramid may have, as patches, a top surface and a bottom surface in a square shape 124 and four side surfaces in a trapezoidal shape 122. Therefore, the shape of the patch may be explicitly indicated but may also be implicitly indicated by the geometry type.

The present disclosure proposes a method for mapping a patch 120, 122, 124 or 126 on a geometry corresponding to the omnidirectional image to a planar video (or 2D video), using a rectangular region 130 defined on the planar video. That is, according to the present disclosure, the transmitting side 100 maps (or projects) an area (including a patch) of the omnidirectional video to a region 130 of the planar image, encodes the planar image, and transmits the encoded media, along with information related to the mapping (i.e., metadata), to the receiving side. Optionally, the transmitting side 100 may encode the mapped planar video using a High-Efficiency Video Coding (HEVC) encoder and may multiplex the encoded media with the metadata using an Omnidirectional Media Application Format (OMAF) multiplexer.

The receiving side 102 receives the encoded media and the metadata. The receiving side 102 may decode the encoded media to obtain an area mapped to a region 140 and may reconstruct (i.e., render) a geometry 160, 162, 164, or 166 of the omnidirectional video from a patch 150, 152, 154, or 156 included in the obtained area using the metadata.

According to the present disclosure, the region is a generalized framework to present mapping (i.e., projecting) to various geometries and may also be referred to as a Super Rectangular Mapping Framework (SRMF). The region on the planar video may have, for example, a rectangular shape. A patch having a triangular, rectangular, circular, trapezoidal, or another shape (e.g., diamond shape) may be fitted to the area, and at least one side of the patch may be accurately fitted in the region on the planar video. Here, the patch being fitted in the region means a case that the patch is disposed such that the entire patch is included in the region, the entirety or part of the boundary line of the patch meets the boundary line of the region, and a non-overlapping portion of the patch and the region is arranged to be minimum. For example, referring to FIG. 1B, when a triangular patch 126 is disposed such that the bottom left vertex and the bottom right vertex thereof meet the lower side of the region 130 and the top vertex thereof meets the upper side of the region 130, the patch 126 may be described as being fitted to the region 130.

At the transmitting side, each surface of the geometry is a triangular, rectangular, circular, or trapezoidal patch and is arranged in a region on the planar video. At the receiving side, video data of the triangular, square, circular, or trapezoidal patch is mapped (projected) to a specified position of the geometry and is rendered. That is, the region may include a patch in various shapes, such as triangular, rectangular, diamond, trapezoidal, or circular shape, inside, and the receiving side uses the video data having the shape of the patch to reconstruct (i.e., render) the omnidirectional video. As described above, the shape of the patch fitted in the region may be indicated by an index value for each region or may be implicitly determined according to the shape of the surface of the geometry.

Each of one or more regions may be arbitrarily selected by the transmitting side, may be selected on the basis of a surface of the geometry in a particular shape, may be selected on the basis of a factor related to encoding and transmission, or may be selected by a combination thereof.

Figure 1C:
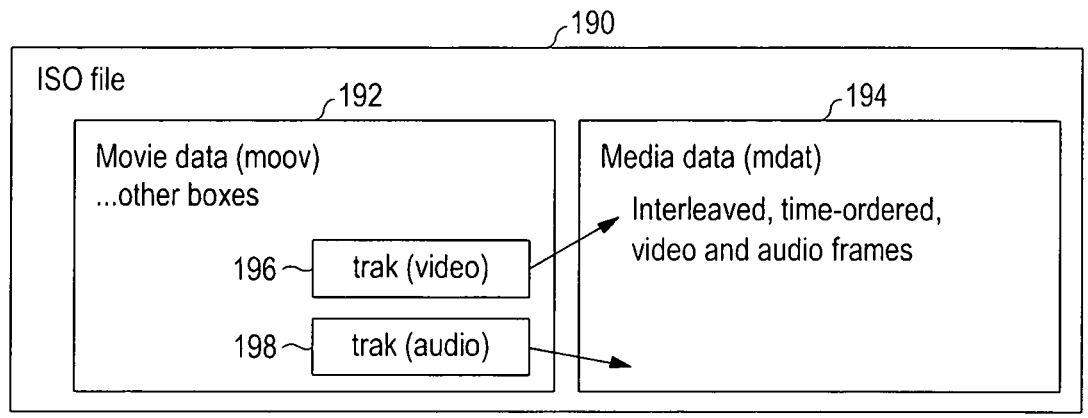
FIG. 1C illustrates an example of an ISO-based media file format to which a technique according to the present disclosure is applicable.

FIG. 1C illustrates an example of an ISO-based media file format to which a technique according to the present disclosure is applicable.

ISO/IEC 14496-12 ISO-based media file format is a flexible and extensible format and may include, as illustrated in FIG. 1C, timed media information 194 to allow interchange, management, edition, and presentation of media. The ISO-based media file 190 may be a default format for an omnidirectional MAF. The media file 190 may include at least one of a moov file 192 and an mdat file 194. The moov file 192 corresponds to, for example, movie data and may include a video trak file 196 or an audio trak file 198. The mdat file corresponds to media data.

Hereinafter, examples of mapping the geometry of various types of omnidirectional videos to one or more regions on a planar video will be described with reference to drawings. Different mapping methods may commonly have one region (i.e., SRMF). A variety of mapping (projecting) forms may be presented by a transmitting side and may be signaled to a receiving side using a rectangular region illustrated above. That is, various geometries that support different mapping methods may be presented using a common region.

Although the operation of the receiving side mapping (projecting) a region of a planar video to a geometry will be described herein, the opposite mapping (projecting) operation (i.e., the operation of the transmitting side mapping (projecting) a geometry to a region of a planar video) may be understood according to the same principle.

When the total number of surfaces of a geometry and the number of regions of a planar video are the same, each region may have a patch in the same shape as that of a corresponding surface. For example, when the geometry is an octahedron, each region may have a triangular patch. Here, each region maps video data corresponding to the entirety of each surface to the patch.

A surface of the geometry corresponding to each region may be designated by an index for each region. For example, the index to designate the surface of the geometry that is transmitted via metadata is 'cylinder_surface_id', 'cube_surface_id', 'triangle_surface_id', or 'ref_triangle_surface_id'. The structure of a metadata to transmit an index will be described later.

Figure 2:
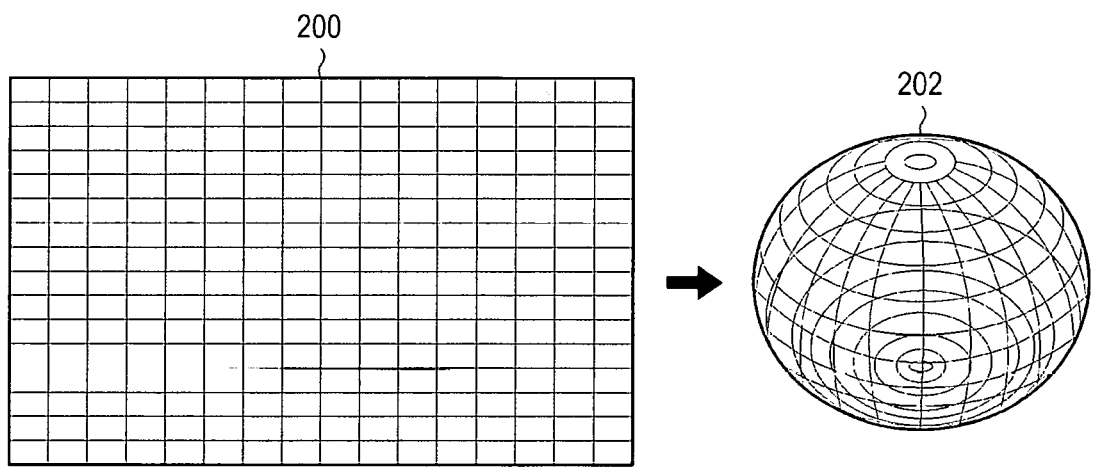
FIG. 2 illustrates a method for reconstructing an omnidirectional video from a region on a planar video when a geometry is a sphere.

FIG. 2 illustrates a method for reconstructing an omnidirectional video from a region on a planar video when a geometry is a sphere.

The geometry of an omnidirectional video may be indicated, for example, via a 'geometry_type' field included in metadata.

When the value of the 'geometry_type' field indicates a sphere, equirectangular projection, which is a method for projecting a planar video into a complete spherical geometry, may be used. Thus, when the geometry is a sphere 202, a region 200 of the planar video may be mapped to the sphere 202.

Figure 3:
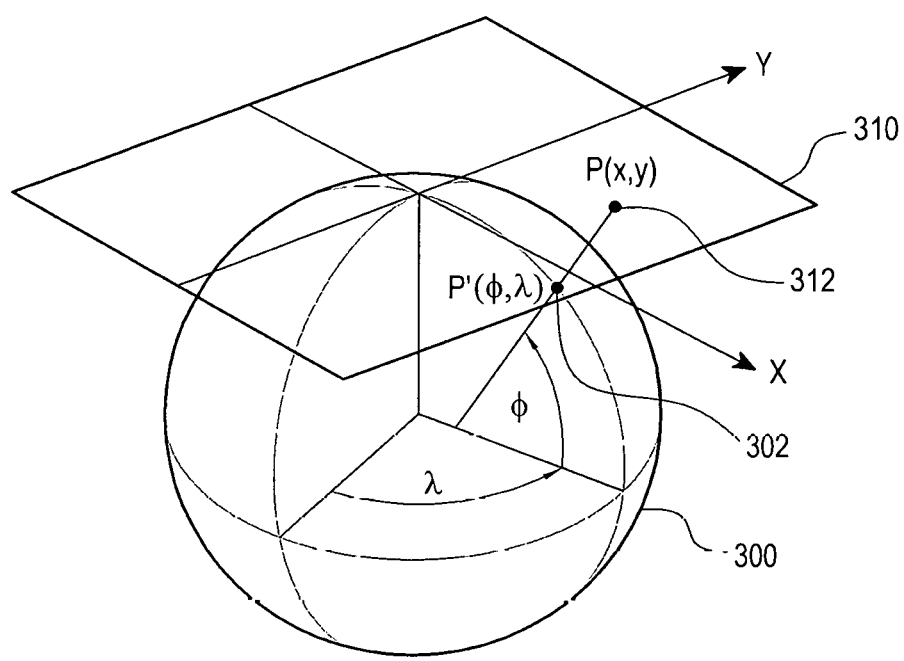
FIG. 3 illustrates a method for projecting a planar video onto a sphere using equirectangular projection.

FIG. 3 illustrates a method for projecting a planar video onto a sphere using equirectangular projection.

In FIG. 3, one point P'($\varphi$, $\lambda$) 302 on a spherical geometry 300 may be projected onto a point P(x, y) 312 on a planar video 310 by the following equation.

$$x = \lambda \cos \phi_1 \qquad \text{[Equation 1]}$$

$$y = \phi$$

The inverse of the equation is represented as follows.

$$\phi = y \qquad \text{[Equation 2]}$$

$$\lambda = x \sec \phi_1$$

Here, $\varphi$ and $\lambda$ denote a latitude and a longitude, respectively, which are expressed in radians, and $\phi_1 = 0$. When a meridian $\lambda_0$ is used, the longitude $\lambda$ may be represented by ($\lambda - \lambda_0$).

Figure 4:
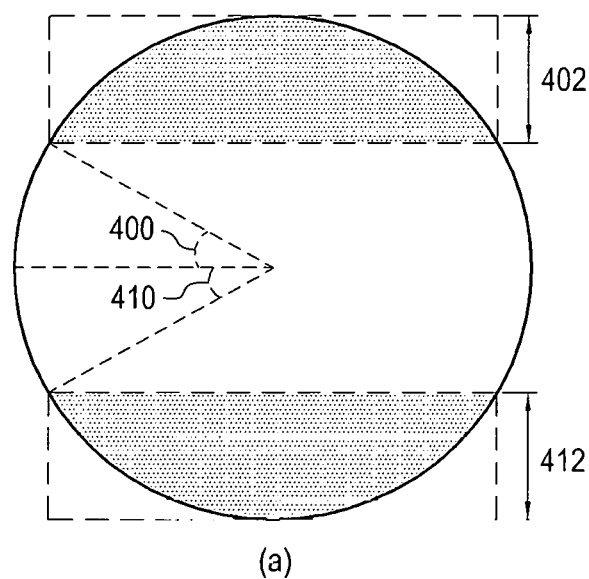
FIG. 4 illustrates a case where the geometry of an omnidirectional video is a squished sphere.
Figure 4:
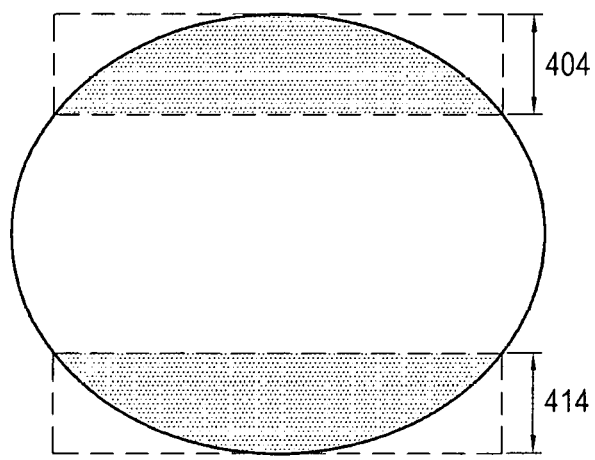

FIG. 4 illustrates a case where the geometry of an omnidirectional video is a squished sphere.

A squished sphere is a sphere that is transformed (generally transformed to have a smaller volume) by pressing the entirety or part of a geometry. A video corresponding to the squished portion of the squished sphere has less importance or loss rate than that of videos corresponding to other portions and thus may be down-sampled.

Referring to FIG. 4, unlike a portion of the sphere that is not transformed, upper and lower portions of the sphere may be partly squished. A top height portion 402 of the sphere starting relative to an angle 400 indicated by a 'squish_start_pitch_top' field may be squished at a ratio of the value of a 'squish_ratio_top' field. A top height portion 404 in (b) of FIG. 4 is a result of squishing at the ratio of in the value of the 'squish_ratio_top' field. Here, the value of the squishing ratio may be normalized to 255. A bottom height portion 412 of the sphere starting relative to an angle 410 indicated by a 'squish_start_pitch_bottom' field may be squished at a ratio of the value of a 'squish_ratio_bottom' field. A bottom height portion 414 in (b) of FIG. 4 is a result of squishing at the ratio of the value of the 'squish_ratio_top' field. Here, the value of the squishing ratio may be normalized to 255.

Figure 5:
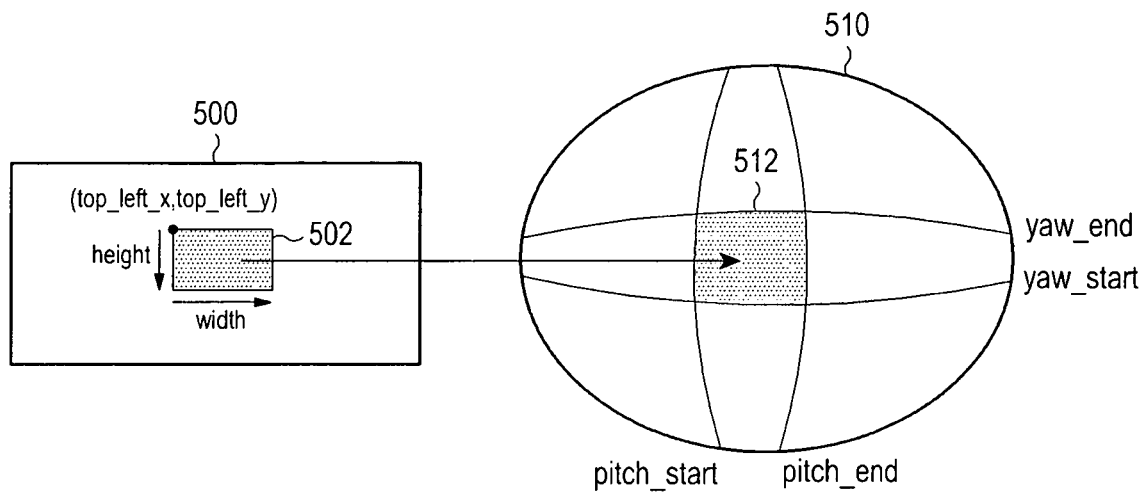
FIG. 5 illustrates a method for projecting an area on an omnidirectional video onto a region on a planar video when a geometry is a sphere or squished sphere.

FIG. 5 illustrates a method for projecting an area on an omnidirectional video onto a region on a planar video when a geometry is a sphere or squished sphere.

One region 502 on a planar video 500 may be mapped to one area 512 of a squished sphere 510. Here, the position of the region 502 on the planar video 500 may be determined by 'region_top_left_x' and 'region_top_left_y' fields, and the extent of the region 502 may be determined by 'region_height' and 'region_width' fields. The determined region may be mapped to the area 512, determined by 'yaw_end', 'yaw_start', 'pitch_start', and 'pitch_end', on the geometry of the sphere 510.

Figure 6:
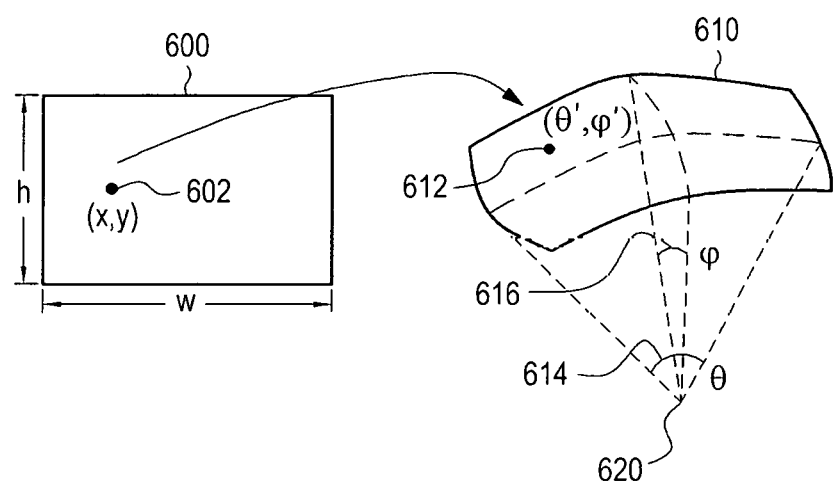
FIG. 6 illustrates a specific example of projecting an omnidirectional video onto a planar video when a geometry is a sphere or squished sphere.

FIG. 6 illustrates a specific example of projecting an omnidirectional video onto a planar video when a geometry is a sphere or squished sphere.

A pixel (x, y) 602 in a rectangular region 600 with a width of w and a height of h on a planar video may be projected onto a point ($\theta$', ($\varphi$') 612 in a curved surface area 610 on a 3D sphere. The curved surface area 610 may be defined by a yaw angle of $\theta$ 614 and a pitch angle $\varphi$ 616. Here, the projected point ($\theta$', $\varphi$') 612 may be defined by the following equation.

$$\theta' = \frac{x\theta}{w} \qquad \text{[Equation 3]}$$

$$\varphi' = \frac{h\varphi}{w}$$

The origin of a (squished) spherical geometry is the geometric center 620 of the sphere. The geometric center 620 of the sphere also corresponds to an observation position for a viewer in the sphere. The yaw angle 614 is determined to range between −180° and 180° on the horizontal plane. The pitch angle 616 is determined to range between −90° and 90° on the vertical plane.

Figure 7:
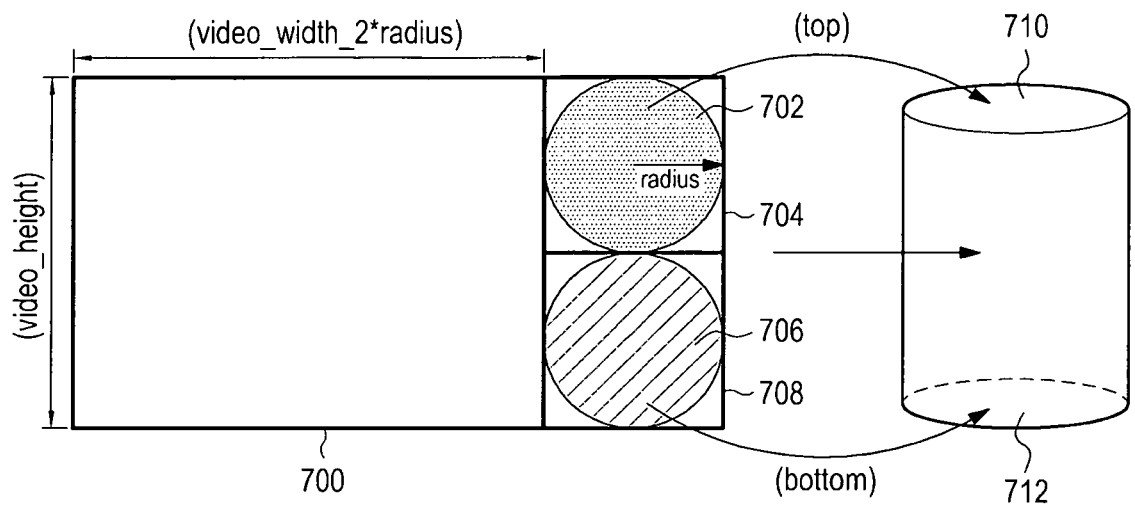
FIG. 7 illustrates reconstruction between regions on an omnidirectional video and a planar video when a geometry is a cylinder.

FIG. 7 illustrates reconstruction between regions on an omnidirectional video and a planar video when a geometry is a cylinder.

When a geometry is a cylinder, two upper and lower circular surfaces may be respectively mapped to regions on a planar video, and one or more rectangular surfaces corresponding to a lateral side may be mapped to a region on the planar video. For example, the planar video mapped to the cylinder may include a rectangular area 700 on the left side, which is mapped to the lateral side of the cylinder, and two rectangular regions 704 and 708 on the right side, into which the circular surfaces 702 and 706 having a radius of the value of a 'radius' field is fitted. The region 704 including an upper circle 702 is mapped to the upper surface 710 of the cylinder, and the region 708 including a lower circle 706 is mapped to the lower surface 712 of the cylinder. The arrangement of the regions is not limited to the above example. Alternatively, the regions 704 and 708 including the circles may be disposed on the left side, and the rectangular area 700 mapped to the lateral side of the cylinder may be disposed on the right side of the regions 704 and 7085 including the circles. In one example, when an area index i is used, i with a value of 0 or 1 may indicate a top area or bottom area.

Figure 8:
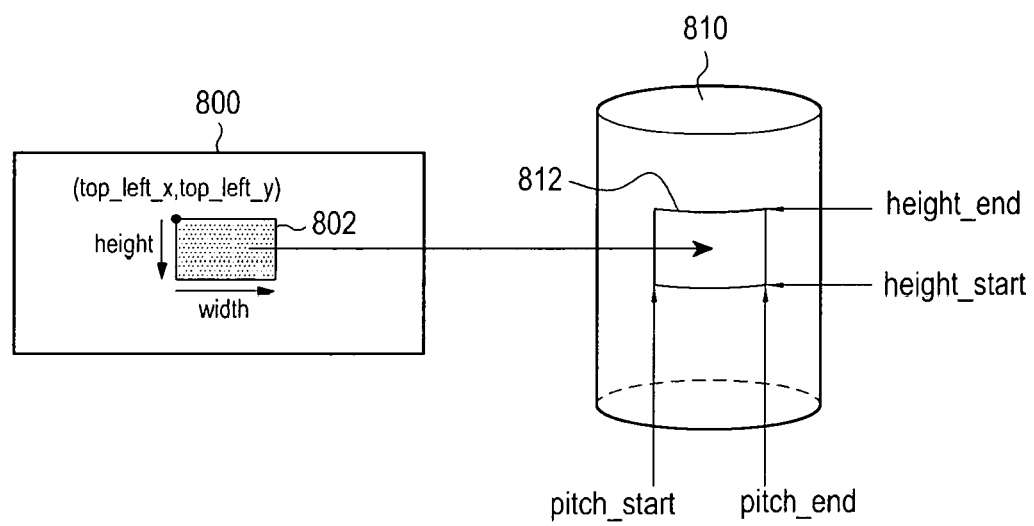
FIG. 8 illustrates an example of projecting a region on a planar video onto an area in a cylinder when a geometry is the cylinder.

FIG. 8 illustrates an example of projecting a region on a planar video onto an area in a cylinder when a geometry is the cylinder.

One region 802 on a planar video 800 may be mapped to one area 812 of a cylinder 810. Here, the position of the region 802 on the planar video 800 may be determined by 'region_top_left_x' and 'region_top_left_y' fields, and the extent of the region 802 may be determined by 'region_height' and 'region_width' fields. The determined region may be mapped to the area 812, determined by 'height_end', 'height_start', 'pitch_start', and 'pitch_end', on the cylinder 810.

Figure 9:
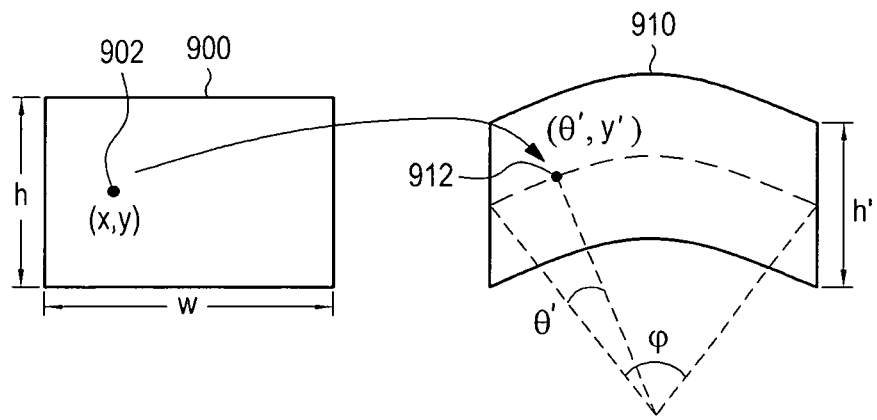
FIG. 9 illustrates a method for projecting a region on a planar video onto a surface of a cylinder when a geometry is the cylinder.

FIG. 9 illustrates a method for projecting a region on a planar video onto a surface of a cylinder when a geometry is the cylinder.

A pixel (x, y) 902 in a rectangular region 900 with a width of w and a height of h of a planar video may be projected onto a point (θ', y') 912 in a curved surface area 910 of a 3D cylinder. The 3D cylinder may be defined by a height of h' and a pitch angle of φ. Here, the projected point (θ', y') may be defined by the following equation.

$$\theta' = \frac{x\varphi}{w}$$
$$y' = \frac{yh'}{h}$$
[Equation 4]

Figure 10A:
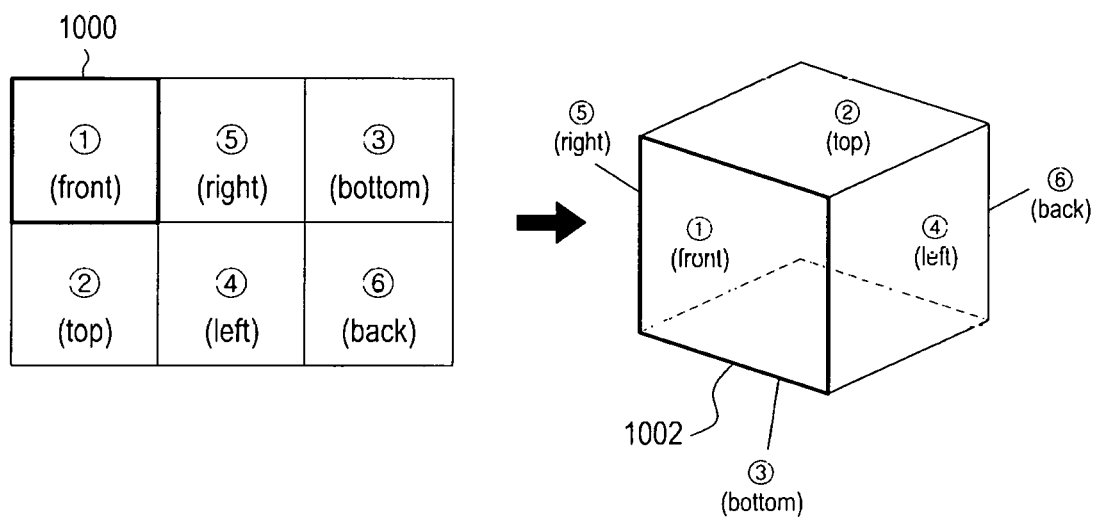
FIGS. 10A and 10B illustrate a method for projecting a region on a planar video onto an area of a cube when a geometry is the cube.

FIG. 10A illustrates a method for projecting a region on a planar video onto an area of a cube when a geometry is the cube.

When a geometry is a cube, six square patches may be mapped to respective regions of a planar video. The regions to be mapped to respective surfaces may be arranged as illustrated in FIG. 10A. For example, one region 1000 may be mapped to one cube surface 1002. The position and size of each region may be indicated by an 'OmniMediaTextureMappingMetadataSample' or 'OmnidirectionalMediaTextureMappingMetadataSample' box.

Figure 10B:
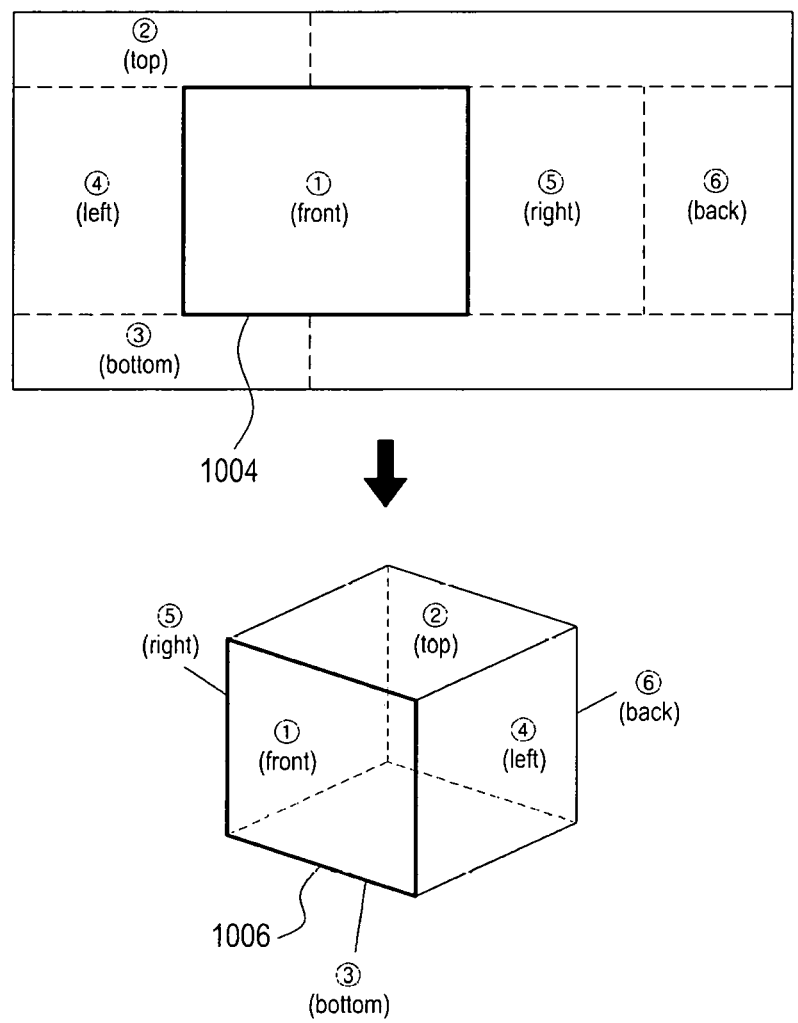

FIG. 10B illustrates another method for projecting a region on a planar video onto an area of a cube when a geometry is the cube.

When a geometry is a cube, six rectangular patches may be mapped to respective regions of a planar video. The regions to be mapped to respective surfaces may be arranged as illustrated in FIG. 10B. For example, one region 1000 may be mapped to one cube surface 1002. The position and size of each region may be indicated by an 'OmniMediaTextureMappingMetadata Sample' or 'OmnidirectionalMediaTextureMappingMetadataSample' box. The 'OmniMediaTextureMappingMetadataSample' or 'OmnidirectionalMediaTextureMappingMetadataSample' box will be described later.

Figure 11:
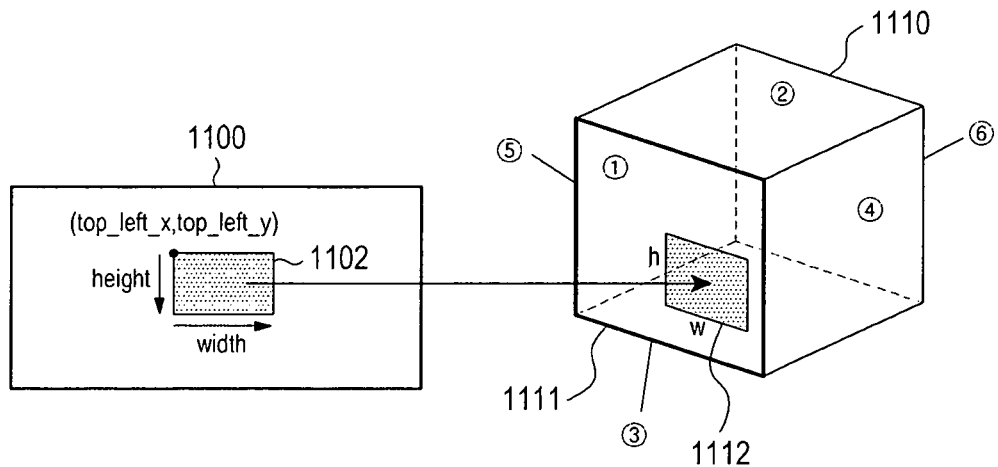
FIG. 11 illustrates a method for projecting a region on a planar video onto an area on a cube when a geometry is the cube.

FIG. 11 illustrates a method for projecting a region on a planar video onto an area on a cube when a geometry is the cube.

One region 1102 on a planar video 1100 may be mapped to one area 1112 on a surface 1111 indicated by 'cube_surface_id' of a cube 1110. Here, the position of the region 1102 on the planar video 1100 may be determined by 'region_top_left_x' and 'region_top_left_y' fields, and the extent of the region 1102 may be determined by 'region_height' and 'region_width' fields. The determined region may be mapped to the area 1112, determined by 'area_top_left_x', 'area_top_left_y', 'area_width', and 'area_height' fields, on the surface 1111 of the cube 1110.

Figure 12:
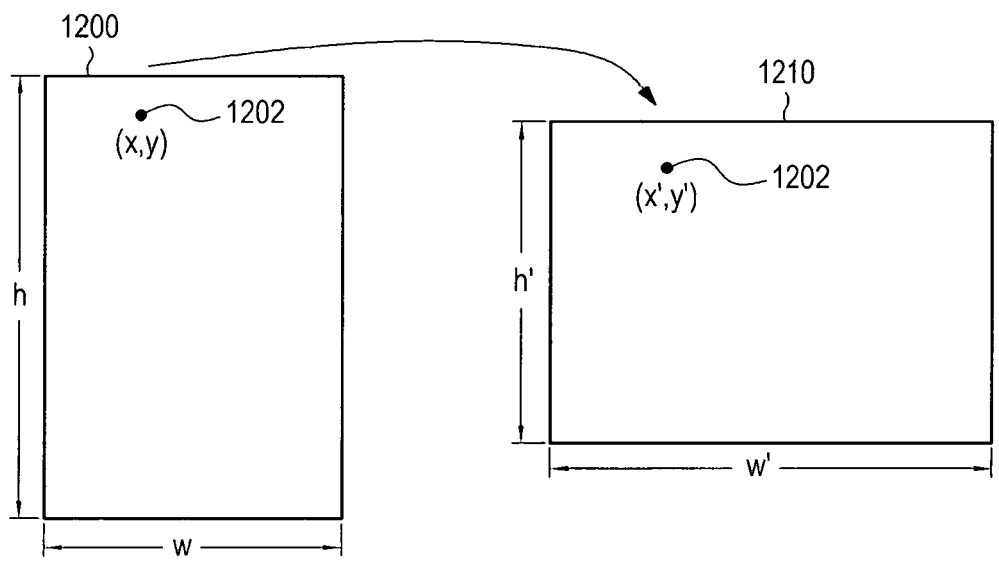
FIG. 12 illustrates a method for projecting a region on a planar video onto a surface on a cube when a geometry is the cube.

FIG. 12 illustrates a method for projecting a region on a planar video onto a surface on a cube when a geometry is the cube.

A pixel (x, y) 1202 in a rectangular region 1200 with a width of w and a height of h of a planar video may be projected onto a point (x', y') 1212 on a rectangular area 1210 of a 3D geometric surface having a width of w' and a height of h'. Here, the projected point (x', y') 1212 may be defined by the following equation.

$$x' = \frac{xw'}{w}$$
$$y' = \frac{yh'}{h}$$
[Equation 5]

Figure 13:
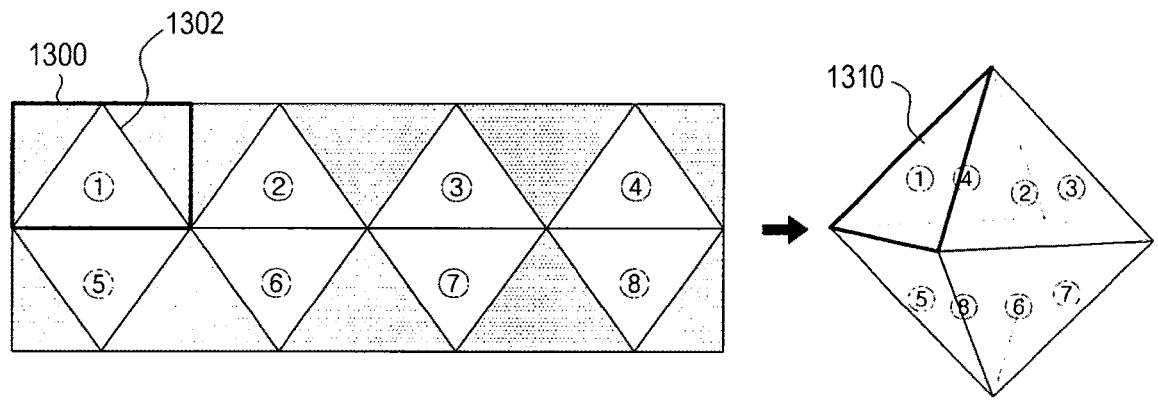
FIG. 13 illustrates an example of projecting a region on a planar video onto an area on a platonic solid when a geometry is a triangle-based octahedron.

FIG. 13 illustrates an example of projecting a region on a planar video onto an area on a platonic solid when a geometry is a triangle-based octahedron.

When a geometry is an octahedron, eight triangular surfaces (patches) may be mapped to regions of a planar video. The triangular patches mapped to respective surfaces may be arranged to fit in the regions of the planar video as shown in FIG. 13. For example, a patch 1302 corresponding to surface ⓑ 1310 of the octahedron is arranged to fit in a rectangular region 1300 on the planar video. For example, when the value of a 'predefined_pattern' field in metadata is 1, areas and patches may be arranged as shown in FIG. 13. The position and size of the triangular patches (i.e., areas) may be defined by FIGS. 17 to 19 and the following equation.

Figure 14:
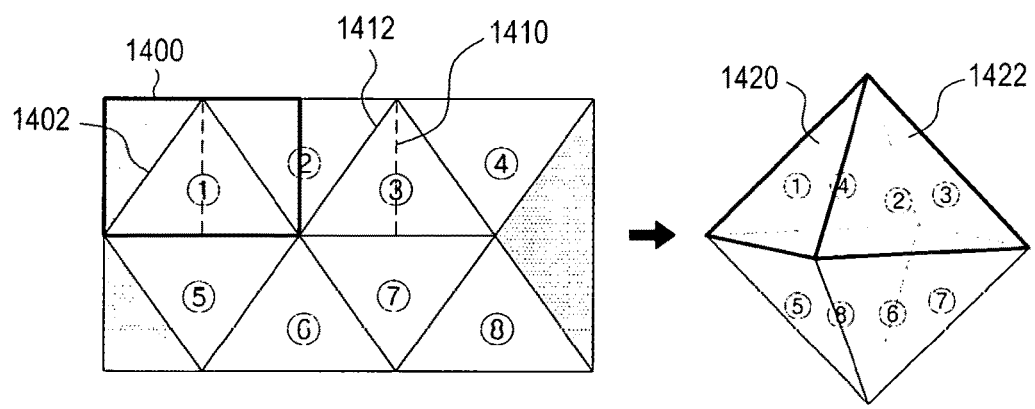
FIG. 14 illustrates another example of projecting a region on a planar video onto an area on a platonic solid when a geometry is a triangle-based octahedron.

FIG. 14 illustrates another example of projecting a region on a planar video onto an area on a platonic solid when a geometry is a triangle-based octahedron.

When a geometry is an octahedron, eight triangular surfaces (patches) may be mapped to regions of a planar video. At least one side of the triangular patches mapped to respective surfaces may be arranged to fit in the regions on the planar video as shown in FIG. 14. In FIG. 14, a region including one patch partially overlaps with another region. For example, a patch 1402 corresponding to surface ⓑ 1420 of the octahedron is arranged to fit in a rectangular region 1400 on the planar video. In addition, a patch 1412 corresponding to surface ⓐ 422 of the octahedron is arranged to fit in a rectangular region 1410 in a dotted line on the planar video. Here, the region 1400 and the region 1410 partially overlap. By arranging the regions to overlap, resources required for data storage of the planar video may be reduced. For example, when the value of a 'predefined_pattern' field in metadata is 2, areas and patches may be arranged as shown in FIG. 14. On the other hand, the patches arranged in the regions may be arranged not to overlap.

Figure 15:
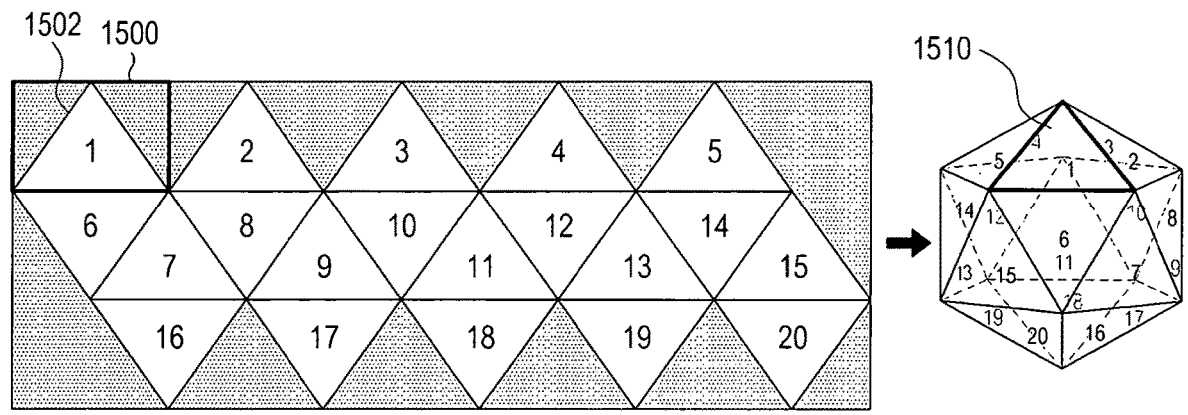
FIG. 15 illustrates an example of projecting a region on a planar video onto an area on a platonic solid when a geometry is a triangle-based icosahedron.

FIG. 15 illustrates an example of projecting a region on a planar video onto an area on a platonic solid when a geometry is a triangle-based icosahedron.

When a geometry is an icosahedron, 20 triangular patches may be mapped to regions of a planar video.

The triangular patches mapped to respective surfaces may be arranged to fit in the regions of the planar video as shown in FIG. 15. For example, a patch 1502 corresponding to surface ⓑ 1510 of the octahedron is arranged to fit in a rectangular region 1500 on the planar video. For example, when the value of a 'predefined_pattern' field in metadata is 1, areas and patches may be arranged as shown in FIG. 15.

Figure 16:
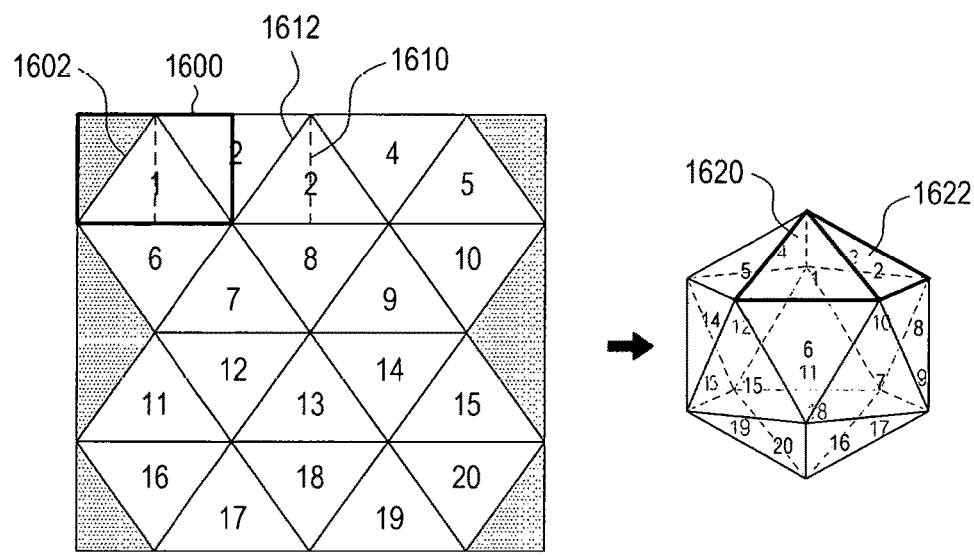
FIG. 16 illustrates another example of projecting a region on a planar video onto an area on a platonic solid when a geometry is a triangle-based icosahedron.

FIG. 16 illustrates another example of projecting a region on a planar video onto an area on a platonic solid when a geometry is a triangle-based icosahedron.

When a geometry is an icosahedron, 20 triangular surfaces may be mapped to regions of a planar video. The triangular patches mapped to respective surfaces may be arranged to fit in the regions on the planar video as shown in FIG. 16. In FIG. 16, a region including one patch partially overlaps with another region. For example, a patch 1602 corresponding to surface ① 1620 of the icosahedron is arranged to fit in a rectangular region 1600 on the planar video. In addition, a patch 1612 corresponding to surface ② 1622 of the icosahedron is arranged to fit in a rectangular region 1610 in a dotted line on the planar video. Here, the region 1600 and the region 1610 partially overlap. By arranging the regions to overlap, resources required for data storage of the planar video may be reduced. For example, when the value of a 'predefined_pattern' field in metadata is 2, areas and patches may be arranged as shown in FIG. 16.

Figure 24:
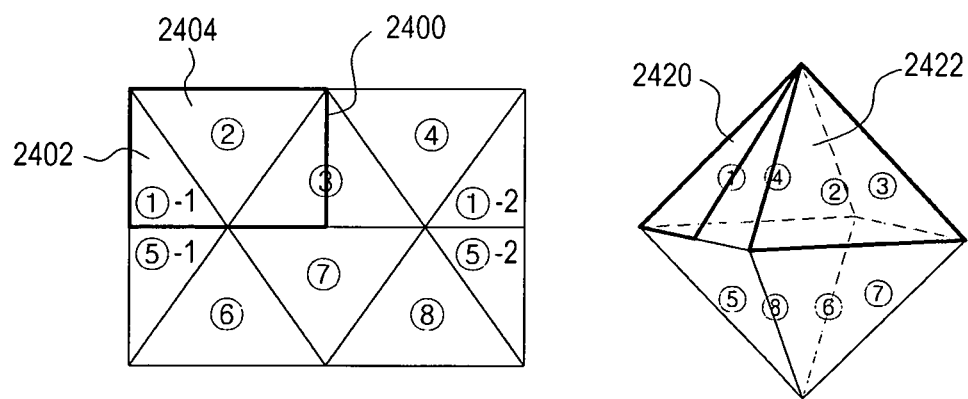
FIG. 24 illustrates still another example of projecting a region on a planar video onto an area on a platonic solid when a geometry is a triangle-based octahedron.

FIG. 24 illustrates still another example of projecting a region on a planar video onto an area on a platonic solid when a geometry is a triangle-based octahedron.

When a geometry is an octahedron, eight triangular surfaces (patches) may be mapped to regions of a planar video. At least one side of the triangular patches mapped to respective surfaces may be arranged to fit in the regions on the planar video as shown in FIG. 24. In FIG. 24, a region including one patch partially overlaps with another region. Furthermore, one patch may be divided into two or more portions, which may be included in separate regions. For example, a patch 2402 corresponding to a half of surface ① 2420 of the octahedron is arranged to fit in a rectangular region 2400 on the planar video. Here, the region 2400 is a region including the entire patch 2404 corresponding to surface ② 2422 of the octahedron. As such, when the shape of a region does not match that of a patch, a patch corresponding to a half of a particular surface may be included in an unoccupied space in the region, thereby minimizing an unoccupied space and reducing resources required for data storage of the planar video. For example, when the value of a 'predefined_pattern' field in metadata is 3, areas and patches may be arranged as shown in FIG. 24. On the other hand, the patches arranged in the regions may be arranged not to overlap.

Figure 25:
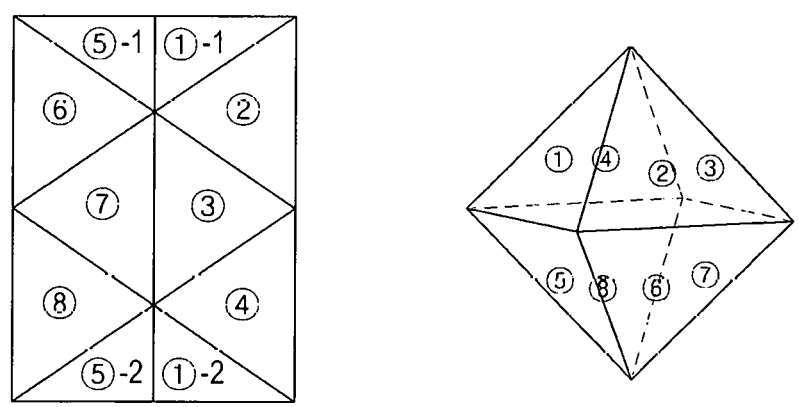
FIG. 25 illustrates yet another example of projecting a region on a planar video onto an area on a platonic solid when a geometry is a triangle-based octahedron.

FIG. 25 illustrates yet another example of projecting a region on a planar video onto an area on a platonic solid when a geometry is a triangle-based octahedron.

When a geometry is an octahedron, eight triangular surfaces (patches) may be mapped to regions of a planar video. At least one side of the triangular patches mapped to respective surfaces may be arranged to fit in the regions on the planar video as shown in FIG. 25. In FIG. 25, a region including one patch partially overlaps with another region. Furthermore, one patch may be divided into two or more portions, which may be included in separate regions. Unlike in FIG. 24, it is shown in FIG. 25 that, for flexibility in arrangement, a patch is rotated by 90 degrees and is fit in a region. As such, when the shape of a region does not match that of a patch, a patch corresponding to a half of a particular surface may be included in an unoccupied space in the region, thereby minimizing an unoccupied space and reducing resources required for data storage of the planar video. For example, when the value of a 'predefined_pattern' field in metadata is 4, areas and patches may be arranged as shown in FIG. 25. On the other hand, the patches arranged in the regions may be arranged not to overlap.

Figure 26:
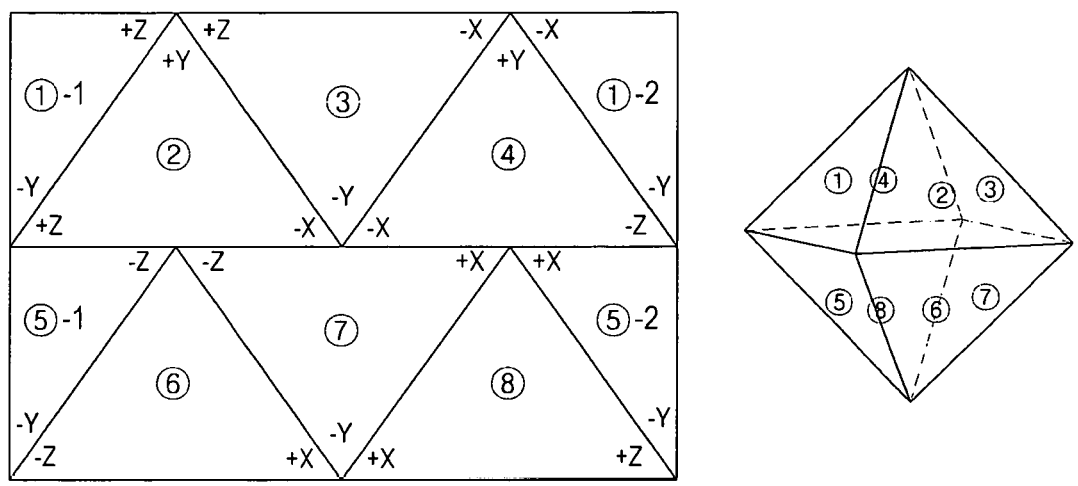
FIG. 26 illustrates yet another example of projecting a region on a planar video onto an area on a platonic solid when a geometry is a triangle-based octahedron.

FIG. 26 illustrates still another example of projecting a region on a planar video onto an area on a platonic solid when a geometry is a triangle-based octahedron.

When a geometry is an octahedron, eight triangular surfaces (patches) may be mapped to regions of a planar video. At least one side of the triangular patches mapped to respective surfaces may be arranged to fit in the regions on the planar video as shown in FIG. 26. In FIG. 26, a region including one patch partially overlaps with another region. Furthermore, one patch may be divided into two or more portions, which may be included in separate regions. Unlike in FIG. 24, it is shown in FIG. 26 that, for flexibility in arrangement, patches corresponding to surfaces ①, ②, ③, and ④ of the octahedron are rotated by 180 degrees and are fit in respective regions. As such, when the shape of a region does not match that of a patch, a patch corresponding to a half of a particular surface may be included in an unoccupied space in the region, thereby minimizing an unoccupied space and reducing resources required for data storage of the planar video. For example, when the value of a 'predefined_pattern' field in metadata is 5, areas and patches may be arranged as shown in FIG. 26. On the other hand, the patches arranged in the regions may be arranged not to overlap.

Figure 17A:
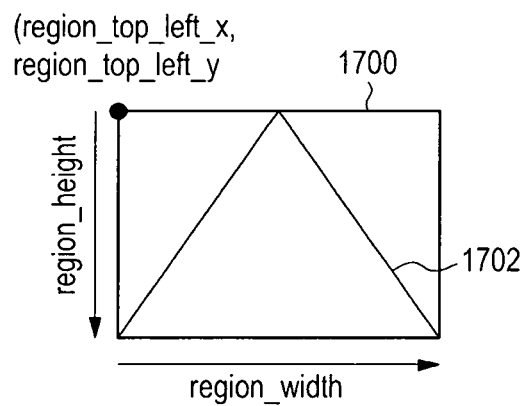
FIG. 17A illustrates metadata related to a region on a planar video and the arrangement of triangular patches when a geometry is a triangle-based platonic solid.

FIG. 17A illustrates metadata related to a region on a planar video and the arrangement of triangular patches when a geometry is a triangle-based platonic solid.

'region_top_left_x' and 'region_top_left_y' included in metadata are fields indicating the left-top position of a region 1700, and 'region_height' and 'region_width' defines the extent of the region 1700.

For example, an octahedron is mapped to eight triangular patch-based regions, in which each patch may be inverted, flipped, or rotated 90 degrees, 180 degrees, or 270 degrees. Here, rotation is an operation of rotating the patch with an axis perpendicular to a plane as the rotation axis, flip is an operation of rotating the patch 180 degrees with one axis horizontal with the plane as the rotation axis, and inversion is an operation of rotating the patch 180 degrees with respect to each of two axes, which are horizontal with the plane and are perpendicular to each other, as rotation axes.

The orientation (i.e., rotation, flip, or inversion) of the patch may be indicated by the value of an 'is_inverted' field included in the metadata. The 'is_inverted' field may be referred to as an 'orientation_of_triangle' field. A triangular patch 1702 illustrated in FIG. 17 illustrates a case where the value of the 'is_inverted' field is 0. The 'is_inverted' field indicating whether the triangular patch is inverted may be included in the metadata when there is no predefined pattern for the patch, that is, when the value of a 'predefined_pattern' field is 0.

Figure 17B:
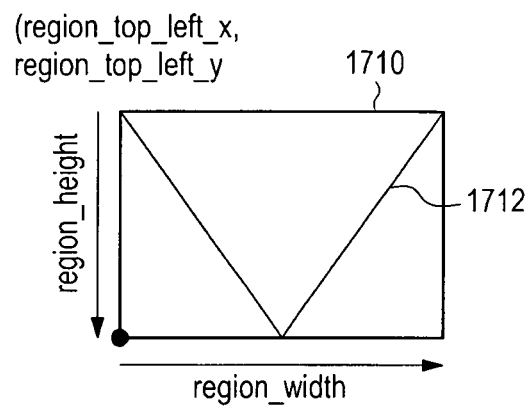
FIG. 17B illustrates metadata related to a region on a planar video and the arrangement of triangular patches when a geometry is a triangle-based platonic solid.

FIG. 17B illustrates metadata related to a region on a planar video and the arrangement of triangular patches when a geometry is a triangle-based platonic solid.

'region_top_left_x' and 'region_top_left_y' included in metadata are fields indicating the left-top position of a region 1710, and 'region_height' and 'region_width' defines the extent of the region 1710.

For example, an octahedron is mapped to eight triangular patch-based regions, in which each patch may be inverted, flipped, or rotated 90 degrees, 180 degrees, or 270 degrees. Rotation, flip, or inversion may be indicated by the value of an 'is_inverted' field included in the metadata. The 'is_inverted' field may be referred to as an 'orientation_of_triangle' field. A triangular patch 1712 illustrated in FIG. 17B, which has an inverted triangular, illustrates a case where the value of the 'is_inverted' field is 1. The 'is_inverted' field indicating whether the triangular patch is inverted may be included in the metadata when there is no predefined pattern for the patch, that is, when the value of a 'predefined_pattern' field is 0.

For example, when an equilateral triangle (i.e., regular triangle) is used for a patch, the value h of the 'region_height' field and the value w of the 'region_width' field satisfy the following equation.

$$h = \frac{\sqrt{3}}{2}w \qquad \text{[Equation 6]}$$

Figure 17C:
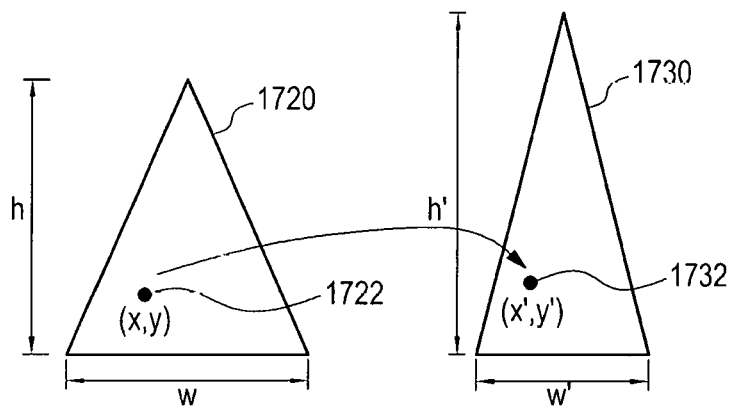
FIG. 17C illustrates projection in a case where a patch in a region of a planar video is an isosceles triangle.

FIG. 17C illustrates projection in a case where a patch in a region on a planar video is an isosceles triangle.

The region on the planar video may be mapped to a triangle surface as follows.

A pixel (x, y) 1722 in an isosceles-triangular region 1720, which has a width of w and a height of h, of the planar video, may be projected onto a point (x', y') in an isosceles-triangular patch 1730, which has a width of w' and a height of h', of a 3D geometry. Here, the projected point (x', y') may be defined by Equation 5.

Figure 18:
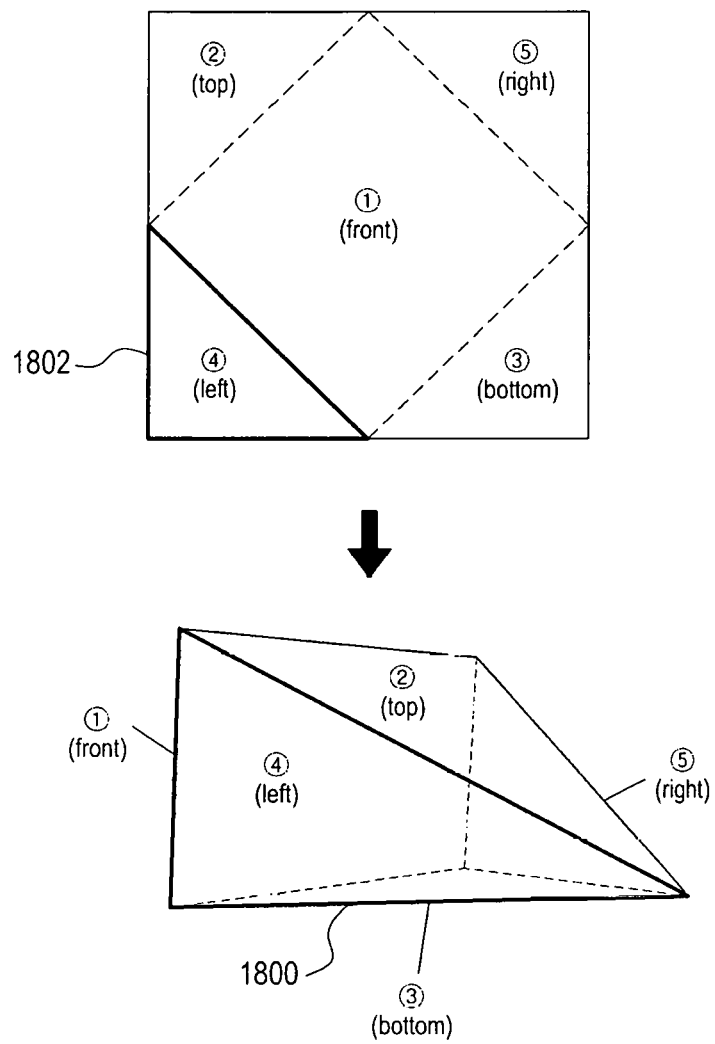
FIG. 18 illustrates a method for projecting a region on a planar video into an area of a pyramid when a geometry is the pyramid.

FIG. 18 illustrates a method for projecting a region on a planar video into an area of a pyramid when a geometry is the pyramid. When a geometry is a pyramid, four triangular patches may be mapped to respective regions of a planar video, and one rectangular patch may be mapped to a region of the planar video. The regions to be mapped to the respective patches may be arranged as illustrated in FIG. 18. For example, a patch corresponding to one left surface 1800 of the pyramid may be mapped to one region 1802 of the planar video. The position and size of each region may be indicated by an 'OmniMediaTextureMappingMetadataSample' or 'OmnidirectionalMediaTextureMappingMetadataSample' box. For example, information on a region mapped to a surface of the pyramid may be determined as in Table 1.

TABLE 1

| Surface_id | Position of top-left corner | Width | Height |
|---|---|---|---|
| 2 | (0, 0) | $w_v$ | $(h_v - h_l)/2$ |
| 3 | (0, $(h_v + h_l)/2$) | $w_v$ | $(h_v - h_l)/2$ |
| 4 | (0, $(h_v - h_l)/2$) | $(w_v - w_l)/2$ | $h_l$ |
| 5 | ($(w_v + w_l)/2$, $(h_v - h_l)/2$) | $(w_v - w_l)/2$ | $h_l$ |

Here, surface IDs (surface_id) of 2, 3, 4, and 5 indicate a top surface, a bottom surface, a left surface, and a right surface of the pyramid, respectively. $w_v$ denotes the width of the video, $w_1$ denotes the width of a region to be mapped to a front surface of the pyramid, $h_v$ denotes the height of the video, and $h_1$ denotes the height of the region to be mapped to the front surface of the pyramid.

According to one embodiment of the present disclosure, when a geometry is a truncated pyramid, four trapezoidal patches may be mapped to respective regions of a planar video, and two rectangular patches may be mapped to respective regions of the planar video.

Hereinafter, examples of a metadata structure for transmission of the foregoing omnidirectional video will be described.

A 'ftyp' box is used to identify the type of an Omnidirectional Media Application Format (OMAF) to which a file structure of an omnidirectional video according to the present disclosure conforms. A brand to identify a file conformant to the present disclosure may be 'omf1 (omnidirectional media application format version 1)' or 'om01 (360-degrees content)'.

One embodiment of illustrative syntax (display format) of metadata (OmnidirectionalMediaTextureMappingMetadataSample) for mapping of an omnidirectional video is illustrated below in Table 2.

The metadata 'OmnidirectionalMediaTextureMappingMetadataSample' provides omnidirectional video information about a geometry type and a projection type and may have an entry type, for example, 'ovmi'.

TABLE 2

```
aligned(8) class OmnidirectionalVideoMediaInformationBox
extends MetadataSampleEntry ('ovmi'){
    unsigned int(1)    is_stereoscopic;
    unsigned int(1)    is_plane;
    unsigned int(1)    use_fine_precision_of_angle;
    unsigned int(1)    is_default_front;
    unsigned int(1)    is_multiple_regions;
    unsigned int(3)    reserved;
    unsigned int(16)   denom;
    if ( is_sterescopic )
        unsigned int(8) stereoscopic_type;
    if ( !is_plane )
        unsigned int(8) geometry_type;
    if ( geometry_type == sphere )
        unsigned int(8) sphere_to_plane_projection_type;
    if ( geometry_type == Squished Sphere ){
        unsigned int (16) squish_start_pitch_top;
        unsigned int (16) squish_start_pitch_bottom;
        unsigned int (8) squish_ratio_top;
        unsigned int (8) squish_ratio_bottom;
    }
    if ( geometry_type == cylinder )
        unsigned int(8) radius;
    if ( use_fine_precision_of_angle )
        unsigned int(8) scale_or_angle;
    if ( !is_default_front ) {
        unsigned int(1) is_2D_center ;
        if ( is_2D_center ) {
            unsigned  int(16)center_x;
            unsigned  int(16)center_y;
        } else {
            unsigned  int(16)center pitch;
            unsigned  int(16)center_yaw;
        }
    }
    if ( is_multiple_regions ) {
        unsigned int(8) num_of_regions;
        for ( i=0; i < num_of_regions; i++) {
            unsigned int(1)   is_available;
            unsigned int(1)   is_static;
            unsigned int(6)   reserved;
            if( is_available ) {
                unsigned int(16)   region_top_left_x;
                unsigned int(16)   region_top_left_y;
                unsigned int(16)   region width;
                unsigned int(16)   region_height;
                if( geometry_type == sphere || squished_sphere ){
                    int(16) sphere_pitch_start;
                    int(16) sphere_yaw_start;
                    int(16) sphere_pitch_end;
                    int(16) sphere_yaw_end;
                }else if( geometry_type == cylinder ){
                    if( i > 1 ) {
                        int(16)   cylinder_pitch_start;
                        int(16)   cylinder_height_start;
                        int(16)   cylinder_pitch_end;
                        int(16)   cylinder_height_end;
                    }
                }else if( geometry_type == cube ){
                    unsigned int(8)  cube_surface_id;
                    unsigned int(16)cube_area_top_left_x;
                    unsigned int(16)cube_area_top_left_y;
```

TABLE 2-continued

```
        unsigned int(16)cube_area_width;
        unsigned int(16)cube_area_height;
    }else if( geometry_type == pyramid ){
        unsigned int(8) pyramid_surface_id;
        if( surface_id == front ){
            unsigned int(16)pyramid_front_area_top_left_x;
            unsigned int(16)pyramid_front_area_top_left_y;
            unsigned int(16)pyramid_front_area_width;
            unsigned int(16)pyramid_front_area_height;
        }else {
            int(16)   pyramid_side_vertex_top_x;
            int(16)   pyramid_side_vertex_top_y;
            int(16)   pyramid_side_vertex_bottom_left_x;
            int(16)   pyramid_side_vertex_bottom_left_y;
            int(16)   pyramid_side_vertex_bottom_right_x;
            int(16)   pyramid_side_vertex_bottom_right_y;
        }
      }
    }
  }
 }
}
```

The semantics of the metadata syntax illustrated in Table 2 are described as follows.

An 'is_stereoscopic' field indicates whether stereoscopic media rendering is used. When the value of the 'is_stereoscopic' field is 1, a video in a reference track (unit omnidirectional video currently being transmitted and received) may be divided into two portions. The two divided portions separately provide different texture data for the left eye and the right eye depending on the composition type specified by a 'stereoscopic_type' field.

An 'is_plane' field indicates whether a current sample is a 2D planar image/video. When the value of the 'is_plane' field is 1, the current sample is a 2D planar image/video and does not need to be projected onto the surface of a rendering model. Otherwise, the current sample may be projected onto the surface of the rendering model, in which the rendering model is determined by 'rendering_model'.

A 'use_fine_prediction_of_angle' field indicates whether a 'scale_of_angle' field is present. When the value of the 'use_fine_prediction_of_angle' field is 0, there is no 'scale_of_angle' field.

An 'is_default_front' field indicates whether 'center_x' and 'center_y' or 'center_pitch' and 'center_yaw' are present.

An 'is_multiple_regions' field indicates whether a video is divided into a plurality of regions. Here, the respective regions may have different resolutions and may be independently mapped onto a corresponding area of a geometry. When the value of the 'is_multiple_regions' field is 1, the video in the reference track is divided into a plurality of non-overlapping regions. Here, each area provides texture data for a specific area of the geometry. Otherwise (when the value is not 1), the entire image data in a 2D image is mapped onto the surface of the geometry without being separated.

A 'denom' field indicates a denominator for normalization.

A 'stereoscopic_type' field may indicate the composition type of a stereoscopic video in the reference track. Examples of the composition type of the stereoscopic video are illustrated below in Table 3.

TABLE 3

| Value | Stereoscopic_type |
|---|---|
| 0x00 | Reserved |
| 0x01 | Side-by-side type |
| 0x02 | Top-and-bottom type |
| 0x03-0xFF | Reserved |

A 'geometry_type' field indicates a geometry type for rendering omnidirectional media. A mathematical expression for each geometry type has been described above with drawings of various geometries.

The geometry types of omnidirectional media are illustrated below in Table 4.

TABLE 4

| Value | Geometry_type |
|---|---|
| 0x00 | Reserved |
| 0x01 | Sphere |
| 0x02 | Squished Sphere |
| 0x03 | Cylinder |
| 0x04 | Cube |
| 0x05 | Platonic Solid: Triangle-based |
| 0x06-0xFF | Reserved |

A 'sphere_to_plane_projection_type' field indicates a method to be used to map texture in the video in the reference track onto the geometry for rendering of the omnidirectional media when the value of the 'geometry_type' field is '0x01' (i.e., a sphere). A mathematical expression for a projection method for each particular geometry type has been described above with drawings of various geometries.

An example of a type to project a sphere onto a cylinder (i.e., a 'sphere_to_plane_projection_type' field) is illustrated below in Table 5.

TABLE 5

| Value | Sphere_to_cylinder_projection |
|---|---|
| 0x00 | Reserved |
| 0x01 | Equirectangular projection |
| 0x02-0xFF | Reserved |

A 'squish_start_pitch_top' field and a 'squish_start_pitch_bottom' field respectively indicate the top pitch angle and the bottom pitch angle of a sphere when squishing is applied. Top and bottom portions of the sphere indicated by the fields may be squished at a ratio given by the value of a 'squish_ratio' field.

The 'squish_ratio' field indicates the squishing ratio of the spherical geometry to be squished. The top and bottom portions of the sphere may be squished by the field according to the present disclosure.

A 'radius' field indicates the radius of a circular region for top and bottom surfaces of a cylinder. A texture region for the top surface may have a circular shape having the radius indicated by the field and may be located at the top-right corner of the video. A texture region for the bottom surface may have a circular shape having the radius indicated by the field and may be located at the bottom-right corner of the video.

A 'scale_of_angle' field indicates the resolution of an angle. When there is no 'scale_of_angle' field, the value of the 'scale_of_angle' field is inferred to be 1.

An 'is_2D_center' field indicates by default whether the center point of a view is set to 'center_x' and 'center_y' or 'center_pitch' and 'center_yaw'. When the value of the 'is_2D_center' field is 1, the center point of a front view is set to (center_x, center_y) in a 2D image/video. Otherwise (when the value of the field is not 1), the center point is set to 3D coordinates of a point where a pitch angle and a yaw angle are (center_pitch/scale_of_angle, center_yaw/scale_of_angle).

A 'center_x' field and a 'center_y' field respectively indicate the horizontal coordinate and the vertical coordinate of a pixel to be rendered at the center of the front of a geometry. In the video in the reference track, pixel data of the 'center_x' field and the 'center_y' field may be rendered at a default point according to the geometry type. When the 'center_x' field and the 'center_y' field does not exist, the values of center_x and center_y are inferred to be 0. When the 'center_x' field and the 'center_y' field exist, the values of center_x and center_y are smaller than the width and the height of the image/video.

A 'center_pitch' field and a 'center_yaw' field respectively indicate the pitch angle and the yaw angle of coordinates of a point at which the center pixel of the video is rendered. When the fields does not exist, the values of the fields may be inferred to be 0. When the fields exist, center_pitch/scale_of_angle and center_yaw/scale_of_angle are smaller than 360.

A 'num_of_regions' field indicates the number of regions into which the video in the reference track is divided. The video in the reference track may be divided into as many non-overlapping regions as the value of the field, and each region may be separately mapped to a specific area of a geometry.

An 'is_available' field indicates whether video data for a current region is present in the reference track. When the value of the 'is_available' field is 1, an area corresponding to the current region may be rendered using the video in the reference track.

An 'is_static' field indicates whether texture mapping of a current region changes with time. When the value of the 'is_static' field is 1, the mapping does not change during the duration of the entire video in the reference track. When the value of the 'is_static' field is 0, the mapping changes with time.

A 'region_top_left_x' field and a 'region_top_left_y' field respectively indicate the horizontal coordinate and the vertical coordinate of the top-left corner of a rectangular region of the video in the reference track.

A 'region_width' field and a 'region_height' field respectively indicate the width and the height of a rectangular region of the video in the reference track.

A 'sphere_pitch_start' field and a 'sphere_pitch_end' field respectively indicate the starting pitch angle and the ending pitch angle of a particular area of a sphere.

A 'sphere_yaw_start' field and a 'sphere_yaw_end' field respectively indicate the starting yaw angle and the ending yaw angle of a particular area of a sphere.

A 'cylinder_pitch_start' field and a 'cylinder_pitch_end' field respectively indicate the starting pitch angle and the ending pitch angle of a particular area of a sphere.

A 'cylinder_start_height' field and a 'cylinder_end_height' field respectively indicate the normalized starting height and the normalized ending height of a particular area of a cylindrical geometry. Values obtained by dividing the 'cylinder_start_height' field and the 'cylinder_end_height' field by 'denom' are smaller than 1.

When a region index i is 0 or 1, a current region indicates a top area or bottom area, and the 'cylinder_pitch_start', 'cylinder_pitch_end', 'cylinder_start_height', and 'cylinder_end_height' fields do not exist.

A 'cube_surface_id' field indicates the identifier of a surface of a cube (regular hexahedron) as illustrated below in Table 6.

TABLE 6

| Value | Cube_surface_id |
|---|---|
| 0x00 | Reserved |
| 0x01 | Front |
| 0x02 | Top |
| 0x03 | Bottom |
| 0x04 | Left |
| 0x05 | Right |
| 0x06 | Back |
| 0x07-0xFF | Reserved |

A 'cube_area_top_left_x' field and a 'cube_area_top_left_y' field respectively indicate the normalized horizontal coordinate and the normalized vertical coordinate of the top-left corner of a particular area of a cube geometry. Values obtained by dividing the 'cube_area_top_left_x' field and the 'cube_area_top_left_y' field by 'denom' are smaller than 1.

A 'cube_area_width' field and a 'cube_area_height' field respectively indicate the normalized width and the normalized height of a particular region of a cube geometry. Values obtained by dividing the 'cube_area_width' field and the 'cube_area_height' field by 'denom' are smaller than 1.

A 'pyramid_surface_id' field indicates the identifier of a surface of a pyramid as illustrated below in Table 7.

TABLE 7

| Value | Pyramid_surface_id |
|---|---|
| 0x00 | Reserved |
| 0x01 | Front |
| 0x02 | Top |
| 0x03 | Bottom |
| 0x04 | Left |
| 0x05 | Right |
| 0x06-0xFF | Reserved |

A 'pyramid_front_area_top_left_x' field and a 'pyramid_front_area_top_left_y' field respectively indicate the horizontal coordinate and the vertical coordinate of the top-left corner of a normalized area of a pyramid. Values obtained by dividing the 'pyramid_front_area_top_left_x' field and the 'pyramid_front_area_top_left_y' field by 'denom' are smaller than 1.

A 'pyramid_front_area_width' field and a 'pyramid_front_area_height' field respectively indicate the normalized width and the normalized height of a particular region of a pyramid geometry. Values obtained by dividing the 'pyramid_front_area_width' field and the 'pyramid_front_area_height' field by 'denom' are smaller than 1.

Figure 19:
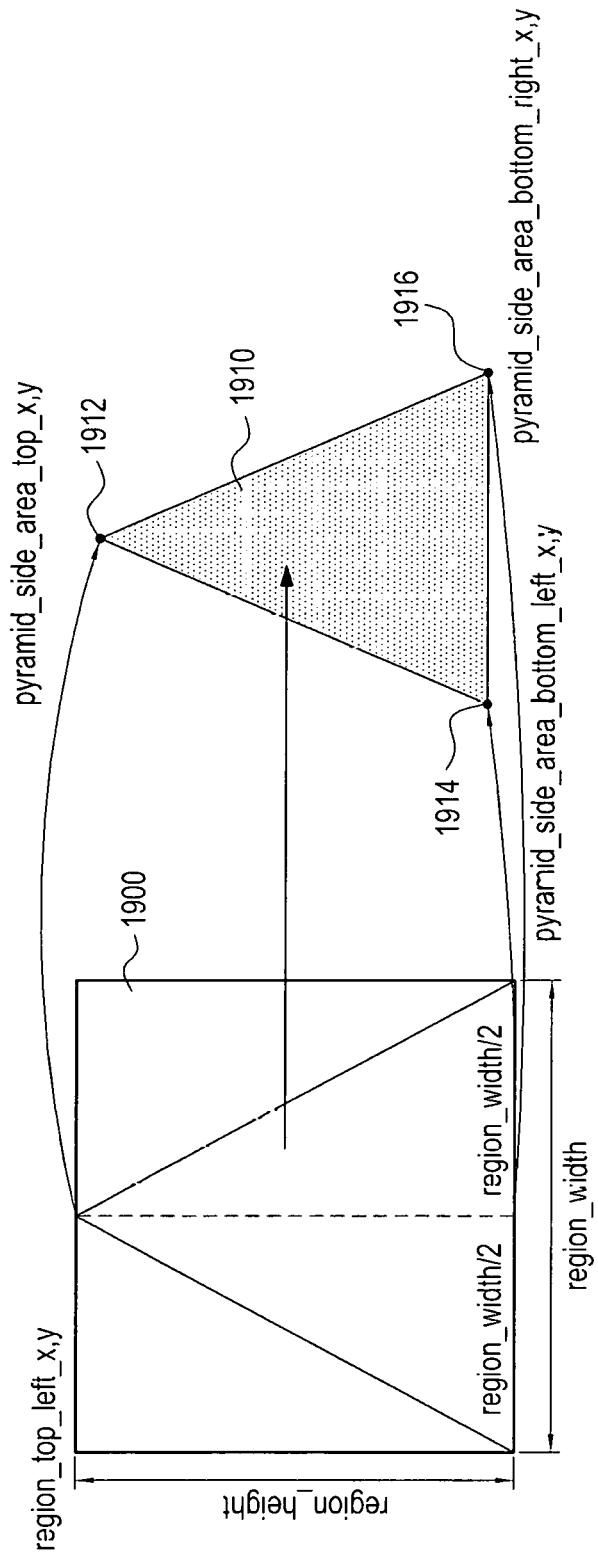
FIG. 19 illustrates another method for projecting a region on a planar video into an area of a pyramid when a geometry is the pyramid.

FIG. 19 illustrates another method for projecting a region on a planar video into an area of a pyramid when a geometry is the pyramid.

In FIG. 19, a region 1900 of a planar video is mapped to an area 1910, which is one side surface of a pyramid.

A 'pyramid_side_area_top_x' field and a 'pyramid_side_area_top_y' field respectively indicate the horizontal coordinate and the vertical coordinate of a top vertex 1912 of the normalized area 1910 in a side surface of the pyramid.

A 'pyramid_side_area_bottom_left_x' field and a 'pyramid_side_area_bottom_left_y' field respectively indicate the horizontal coordinate and the vertical coordinate of a bottom-left vertex 1914 of the normalized area 1910 in the side surface of the pyramid. Values obtained by dividing the 'pyramid_side_area_bottom_left_x' field and the 'pyramid_side_area_bottom_left_y' field by 'denom' are smaller than 1.

A 'pyramid_side_area_bottom_right_x' field and a 'pyramid_side_area_bottom_right_y' field respectively indicate the horizontal coordinate and the vertical coordinate of a bottom-right vertex 1916 of the normalized area 1910 in the side surface of the pyramid. Values obtained by dividing the 'pyramid_side_area_bottom_right_x' field and the 'pyramid_side_area_bottom_right_y' field by 'denom' are smaller than 1.

Another embodiment of illustrative syntax (display format) of metadata (OmnidirectionalMediaTextureMappingMetadataSample) for mapping of an omnidirectional video is illustrated below in Table 8.

TABLE 8

```
aligned(8) class OmnidirectionalMediaTextureMappingSampleEntry
extends MetadataSampleEntry ('omtm'){
    unsigned int(1)    is_stereoscopic;
    unsigned int(1)    is_default_front;
    unsigned int(1)    entire_volume;
    unsigned int(1)    static;
    unsigned int(1)    static_top;
    unsigned int(1)    static_bottom;
    unsigned int(2)    reserved;
    if ( is_stereoscopic )
        unsigned int(8) stereoscopic_type;
    unsigned int(8) geometry_type;
    if ( geometry_type == Squished Sphere ){
        unsigned int (16) squish_start_pitch_top;
        unsigned int (16) squish_start_pitch_bottom;
        unsigned int (8) squish_ratio_top;
        unsigned int (8) squish_ratio_bottom;
    }
    if ( geometry_type == Cylinder )
        unsigned int(8) radius;
    if ( geometry_type == Platonic Solid)
        unsigned int(8) num_triangles;
    if ( !is_default_front ) {
        unsigned int(16)center_pitch;
        unsigned int(16)center_yaw;
    }
}
```

The semantics of the metadata syntax illustrated in Table 8 are described as follows.

An 'is_stereoscopic' field indicates whether stereoscopic media rendering is used. When the value of the 'is_stereoscopic' field is 1, a video in a reference track (unit omnidirectional video currently being transmitted and received) may be divided into two portions for the two eyes. The two divided portions separately provide different texture data for the left eye and the right eye depending on the composition type specified by a 'stereoscopic_type' field.

An 'is_default_front' field may indicate whether a 'center_pitch' field and a 'center_yaw' field are present.

An 'entire_volume' field indicates whether the video in the reference track covers the entire volume of a geometry. When the value of the 'entire_volume' field is 1, the entire volume of the geometry may be rendered by the video in the reference track. When the value of the 'entire_volume' field is 0, the texture of a particular region of the geometry may be provided by a means other than the video in the reference track.

A 'static' field indicates whether texture mapping (mapping between a region and a patch) changes with time. When the value of the 'static' field is 1, the mapping may not change during the entire video in the reference track. When the value of the 'static' field is 0, the mapping may change with time.

A 'static_top' field indicates whether texture data is provided instead of the video in the reference track. When the value of the 'static_top' field is 1, image data used as a top area of the geometry may be provided.

A 'static_bottom' field indicates whether texture data is provided instead of the video in the reference track. When the value of the 'static_bottom' field is 1, image data used as a bottom area of the geometry may be provided.

A 'stereoscopic_type' field may indicate the composition type of a stereoscopic video in the reference track.

The composition type of the stereoscopic video is illustrated above in Table 3.

A 'geometry_type' field indicates a geometry type for rendering an omnidirectional video. A mathematical expression for each geometry type has been described above with drawings of various geometries.

The geometry types of the omnidirectional video are illustrated above in Table 4.

A 'squish_start_pitch_top' field and a 'squish_start_pitch_bottom' field respectively indicate the top pitch angle and the bottom pitch angle of a sphere when squishing is applied. Top and bottom portions of the sphere indicated by the 'squish_start_pitch_top' and 'squish_start_pitch_bottom' fields may be squished at a ratio given by the value of a 'squish_ratio' field.

A 'squish_ratio_top' field indicates the squishing ratio of the spherical geometry to be squished. For example, the top portion of the sphere may be squished by the 'squish_ratio_top' field according to the present disclosure.

The 'squish_ratio_bottom' field indicates the squishing ratio of the spherical geometry to be squished. The bottom portion of the sphere may be squished by the 'squish_ratio_bottom' field according to the present disclosure.

A 'radius' field indicates the radius of a circular patch for top and bottom surfaces of a cylinder. A region for the top surface may have a circular shape having the radius indicated by the field and may be located at the top-right corner of the planar video. A region for the bottom surface may have a circular shape having the radius indicated by the field and may be located at the bottom-right corner of the planar video.

A 'num_triangles' field may indicate a platonic solid type for rendering the omnidirectional video. A mathematical expression for each geometry type has been described above.

Table 9 illustrates the number of triangles according to the omnidirectional video.

TABLE 9

| Value | Num_triangles |
|---|---|
| 0x00 | Reserved |
| 0x01 | Octahedron: 8 sides |
| 0x02 | Icosahedrons: 20 sides |
| 0x03-0xFF | Reserved |

A 'center_pitch' field and a 'center_yaw' field respectively indicate the pitch angle and the yaw angle of coordinates of a point at which the center pixel of the video is rendered. When the 'center_pitch' field and the 'center_yaw' field are not included, the values of the fields may be inferred to be 0.

Syntax of additional metadata for mapping of the omnidirectional video is illustrated below in Table 10.

TABLE 10

```
aligned(8) class OmniMediaTextureMappingMetadataSample( ){
    unsigned int(16) center_pitch_offset;
    unsigned int(16) center_yaw_offset;
    if(geometry_type != sphere){
        unsigned int(8) num_of_regions;
        for(i=0; i < num_of_regions ; i++){
            unsigned int(16) region_top_left_x;
            unsigned int(16) region_top_left_y;
            unsigned int(16) region_width;
            unsigned int(16) region_height;
            if(geometry_type == Squished_Sphere){
                int(16) pitch_start;
                int(16) yaw_start;
                int(16) pitch_end;
                int(16) yaw_end;
            }else if(geometry_type == Cylinder){
                unsigned int(16) cylinder_surface_id;
                if(cylinder_surface_id == side){
                    int(16) yaw_start;
                    int(16) height_start;
                    int(16) yaw_end;
                    int(16) height _end;
                }
            }else if(geometry_type == Cube){
                unsigned int(16) cube_surface_id;
                unsigned int(16) area_top_left_x;
                unsigned int(16) area_top_left_y;
                unsigned int(16) area_width;
                unsigned int(16) area_height;
            }else if(geometry_type == Platonic Solid){
                unsigned int(16) predefined_pattern;
                if(predefined_pattern == 0)
                {
                    unsigned int(16) triangle_surface_id;
                    unsigned int(1) relative _position;
                    unsigned int(1) is_inverted;
                    if(relative_position == 0){
                        unsigned int(16) area_top_left_x;
                        unsigned int(16) area_top_left_y;
                        unsigned int(16) area_width;
                        unsigned int(16) area_height;
                    }else {
                        unsigned int(16) ref_triangle_surface_id;
                        int(16) area_top_left_x_diff;
                        int(16) area_top_left_y_diff;
                        unsigned int(16) area_width;
                        unsigned int(16) area_height;
                    }
                }
            }
        }
    }
}
```

The semantics of Table 10 are described as follows.

A 'center_pitch_offset' field and a 'center_yaw_offset' field respectively indicate an offset for the pitch angle and an offset for the yaw angle of coordinates of a point at which the center pixel of the omnidirectional video is rendered. As a result, 'center_pitch_offset'+'center_pitch' and 'center_yaw_offset'+'center_yaw' indicate the center point (x, y) of a current sample.

A 'num_of_regions' field indicates the number of regions into which the planar video in the reference track is divided. The video in the reference track may be divided into as many non-overlapping regions as the value of the 'num_of_regions' field, and each region may be separately mapped to a specific area of a geometry. When the value of the 'geometry_type' field is 'Platonic Solid', the value of the 'num_of_regions' field may be the same as the value of the 'num_triangles' field.

A 'region_top_left_x' field and a 'region_top_left_y' field respectively indicate the horizontal coordinate and the vertical coordinate of the top-left corner of a rectangular region in the reference track.

A 'region_width' field and a 'region_height' field respectively indicate the width and the height of the rectangular region in the reference track.

A 'pitch start' field and a 'pitch_end' field respectively indicate the starting pitch angle and the ending pitch angle of a particular area of the geometry.

A 'yaw_start' field and a 'yaw_end' field represent the starting yaw angle and the ending yaw angle of a particular area of the geometry.

A 'cylinder_surface_id' field indicates the identifier of a surface of a cylinder to be described below.

Table 11 illustrates examples of a cylinder surface identifier.

TABLE 11

| Value | Cylinder_surface_id |
|---|---|
| 0x00 | Reserved |
| 0x01 | Top |
| 0x02 | Bottom |
| 0x03 | Side |
| 0x04-0xFF | Reserved |

A 'height_start' field and a 'height_end' field respectively indicate the normalized starting height and the normalized ending height of a particular area of a cylindrical geometry.

A 'cube_surface_id' field indicates the identifier of a surface (patch) of a cube (regular hexahedron) to be described below.

Examples of a cube surface identifier are illustrated above in Table 6.

An 'area_top_left_x' field and an 'area_top_left_y' field respectively indicate the horizontal coordinate and the vertical coordinate of the top-left corner of an area on the surface of a cube when a geometry is the cube. An 'area_width' field and an 'area_height' field respectively indicate the width and the height of an area on the surface of the cube.

A 'predefined_pattern' field indicates a pattern for a triangle position. When the value of the 'predefined_pattern' field is 0, 'triangle_surface_id', 'is_inverted', 'area_top_left_x', 'area_top_left_y', 'area_width', and 'area_height' fields for each triangle exist. When the value of the 'predefined_pattern' field is not 0, the value of the 'predefined_pattern' field specifies a predefined position for all triangles.

A 'triangle_surface_id' field indicates the identifier of a surface of a triangle for a platonic solid.

A 'relative_position' field indicates whether the 'area_top_left_x' field and the 'area_top_left_y' field exist or indicates whether an 'area_top_left_x_diff' field and an 'area_top_left_y_diff' field exist.

A 'ref_triangle_surface_id' field may indicate the identifier of a surface of a reference triangle for a platonic solid:

The 'area_top_left_x_diff' field and the 'area_top_left_y_diff' field respectively indicate a horizontal difference and a vertical difference between the top-left corner of a reference triangle specified by 'ref_triangle_surface_id' and the top-left corner of a current triangle (a surface of the triangle mapped to a region on the planar video).

The 'is_inverted' field indicates the shape (e.g., rotation, inversion, or flip) of a triangle as described below. The 'is_inverted' field may be referred to as an 'orientation_of_triangle' field.

Figure 20:
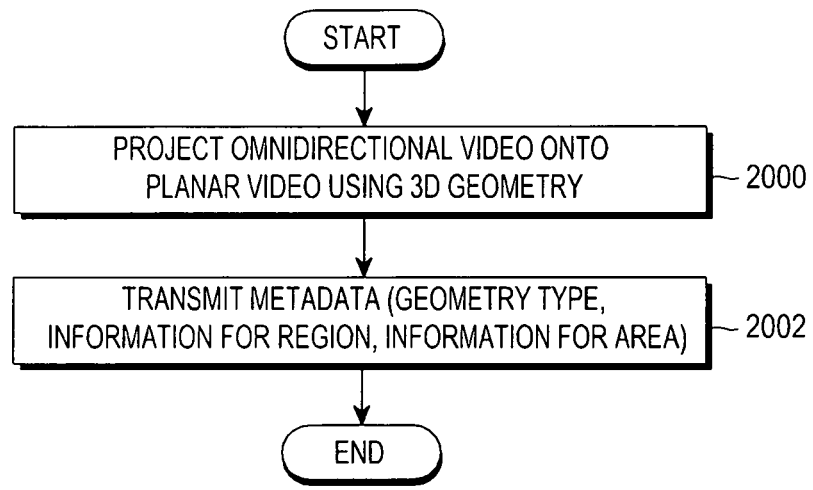
FIG. 20 illustrates a method in which a transmitting side transmits metadata of an omnidirectional video according to the present disclosure.

FIG. 20 illustrates a method in which a transmitter transmits metadata of an omnidirectional video according to the present disclosure.

The transmitter projects an omnidirectional video onto a planar video using a 3D geometry corresponding to the omnidirectional video (2000).

The transmitter transmits metadata including type information of the 3D geometry, information for a region on the projected planar video, and information for an area on the omnidirectional video which is mapped to the region (2002). The information for the region on the planar video included in the metadata may include a coordinate to specify the position of the region in the planar video. The region may have a rectangular shape, and thus the information for the region on the planar video may further include the width and the height of the region.

Figure 21:
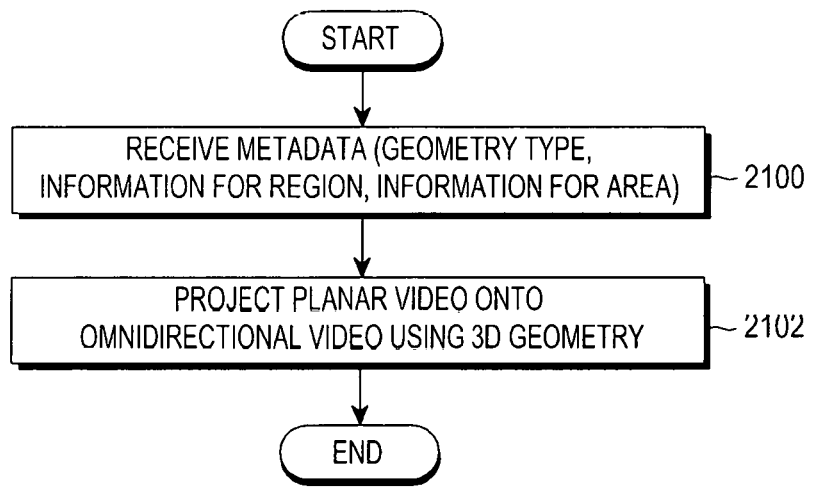
FIG. 21 illustrates a method in which a receiving side receives metadata of an omnidirectional video according to the present disclosure.

FIG. 21 illustrates a method in which a receiver receives metadata of an omnidirectional video according to the present disclosure.

The receiver receives metadata including type information of a 3D geometry corresponding to an omnidirectional video, information for a region on a planar video, and information for an area on the omnidirectional video which is mapped to the region (2100).

The receiver projects the planar video onto the omnidirectional video using the 3D geometry corresponding to the omnidirectional video (2012). The information for the region on the planar video included in the metadata may include a coordinate to specify the position of the region in the planar video. The region may have a rectangular shape, and thus the information on the region of the planar video may further include the width and the height of the region.

Figure 22:
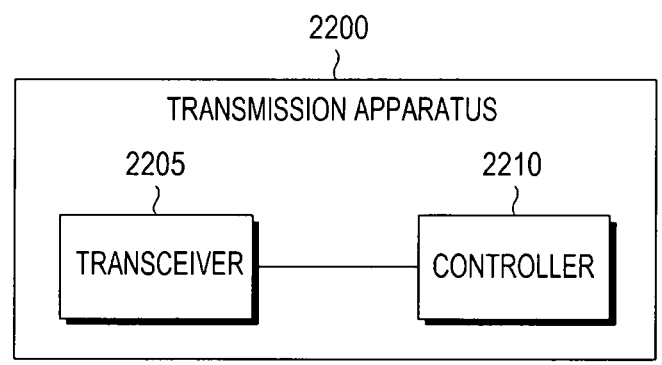
FIG. 22 illustrates the configuration of a transmission apparatus according to the present disclosure.

FIG. 22 illustrates the configuration of a transmission apparatus according to the present disclosure.

The transmission apparatus 2200 may include a transceiver 2205 to perform data transmission and reception with a reception apparatus and a controller 2210 to control all operations of the transmission apparatus 2200. All operations of a transmitter described above in the present disclosure may be construed as being performed under the control of the controller 2210. The controller 2210 and the transceiver 2205 are not necessarily configured as separate devices but may be configured as one component, such as a single chip.

Figure 23:
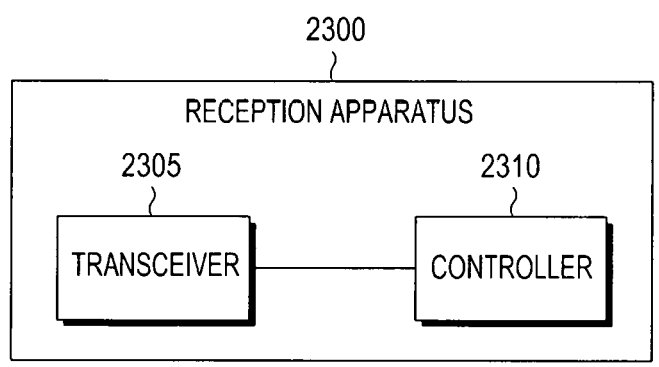
FIG. 23 illustrates the configuration of a reception apparatus according to the present disclosure.

FIG. 23 illustrates the configuration of a reception apparatus according to the present disclosure.

The reception apparatus 2300 may include a transceiver 2305 to perform data transmission and reception with a transmission apparatus and a controller 2310 to control all operations of the reception apparatus 2300. All operations of a receiver described above in the present disclosure may be construed as being performed under the control of the controller 2310. The controller 2310 and the transceiver 2305 are not necessarily configured as separate devices but may be configured as one component, such as a single chip.

It should be noted that the diagrams illustrating methods, the diagrams illustrating mapping between a planar video and an omnidirectional video, and the diagrams illustrating device configurations, which are shown in FIGS. 1 to 26, are not intended to limit the scope of the present disclosure. That is, all components or stages of operations described in FIGS. 1 to 26 are not construed as being essential elements to achieve the present disclosure, but the present disclosure may be implemented with only some components without departing from the essence of the present disclosure.

The above described operations may be implemented by providing a memory device storing corresponding program codes in any constituent unit of a server or UE apparatus in a communication system. That is, the controller of the base station or UE may perform the above described operations by reading and executing the program code stored in the memory device by means of a processor or a Central Processing Unit (CPU).

The entity, the function, the base station, the load manager, various structural elements of the terminal, modules and the like may be operated by using a hardware circuit, e.g, a complementary metal oxide semiconductor based logic circuit, firmware, software, and/or a combination of hardware and the firmware and/or software embedded in a machine readable medium. As an example, various electric configurations and methods may be carried out by using electric circuits such as transistors, logic gates, and an Application Specific Integrated Circuit (ASIC).

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

The invention claimed is:

1. A method for transmitting, by a transmission apparatus, metadata related to an omnidirectional video, the method comprising:
    identifying a planar video projected from the omnidirectional video and the metadata; and
    transmitting data for the planar video and the metadata,
    wherein the metadata comprises information on regions defined on the planar video and type information of a three dimensional (3D) geometry for the omnidirectional video,
    wherein the information on the regions defined on the planar video comprises information on a location of each of the regions on the planar video, information on a width of each of the regions, information on a height of each of the regions, and information on a number of the regions,
    wherein the information on the location of each of the regions on the planar video indicates a horizontal coordinate and a vertical coordinate of an upper left corner of each of the regions on the planar video, and
    wherein, when the 3D geometry comprises a squished sphere:
        the metadata further comprises top pitch angle information of the squished sphere, bottom pitch angle information of the squished sphere, top squishing ratio information of the squished sphere, and bottom squishing ratio information of the squished sphere, and information for an area on the omnidirectional video which is mapped to the region, and
        the information for the area on the omnidirectional video comprises a starting pitch angle, a starting yaw angle, an ending pitch angle, and an ending yaw angle to specify the area.

2. The method of claim 1, wherein the metadata further comprises information for a surface of a three dimensional (3D) geometry corresponding to the omnidirectional video, and the surface of the 3D geometry is mapped in the region.

3. The method of claim 1, wherein, when the 3D geometry comprises a sphere:
the metadata further comprises information for an area on the omnidirectional video which is mapped to the region, and
the information for the area on the omnidirectional video comprises a starting pitch angle, a starting yaw angle, an ending pitch angle, and an ending yaw angle to specify the area.

4. The method of claim 1, wherein, when the 3D geometry comprises a cylinder:
the metadata further comprises information for an area on the omnidirectional video which is mapped to the region,
the information for the area on the omnidirectional video comprises information indicating a surface of the cylinder that the area corresponds to, and
when the information for the area indicates a side, the information for the area on the omnidirectional video further comprises a starting yaw angle, an ending yaw angle, a starting height, and an ending height to specify the area.

5. The method of claim 1, wherein, when the 3D geometry comprises a cube:
the metadata further comprises information for an area on the omnidirectional video which is mapped to the region, and
the information for the area on the omnidirectional video comprises information indicating a surface of the cube the area corresponds to, a coordinate to specify a position of the area in the surface, a width of the area, and a height of the area.

6. The method of claim 1, wherein, when the 3D geometry comprises a platonic solid having triangular surfaces:
the metadata further comprises information for an area on the omnidirectional video which is mapped to the region, and
the information for the area on the omnidirectional video comprises information indicating a triangle of the platonic solid the area corresponds to, orientation information of the triangle, a coordinate to specify a position of the area in a surface, a width of the area, and a height of the area.

7. The method of claim 6, wherein a pixel (x, y) in the region on the planar video is projected onto a point (x', y') in the area on the omnidirectional video, and the pixel (x, y) and the point (x', y') satisfy an equation illustrated below:

$$x' = \frac{xw'}{w}$$
$$y' = \frac{yh'}{h},$$

where w' is a width of the area, and h' is a height of the area.

8. A method for receiving, by a reception apparatus, metadata related to an omnidirectional video, the method comprising:
receiving data for a planar video projected from the omnidirectional video and the metadata; and
rendering the data based on the metadata,
wherein the metadata comprises information on regions defined on the planar video and type information of a three dimensional (3D) geometry for the omnidirectional video,
wherein the information on the regions defined on the planar video comprises information on a location of each of the regions on the planar video, information on a width of each of the regions, information on a height of each of the regions, and information on a number of the regions,
wherein the information on the location of each of the regions on the planar video indicates a horizontal coordinate and a vertical coordinate of an upper left corner of each of the regions on the planar video, and
wherein, when the 3D geometry comprises a squished sphere:
the metadata further comprises top pitch angle information of the squished sphere, bottom pitch angle information of the squished sphere, top squishing ratio information of the squished sphere, and bottom squishing ratio information of the squished sphere, and information for an area on the omnidirectional video which is mapped to the region, and
the information for the area on the omnidirectional video comprises a starting pitch angle, a starting yaw angle, an ending pitch angle, and an ending yaw angle to specify the area.

9. The method of claim 8, wherein the metadata further comprises information for a surface of a three dimensional (3D) geometry corresponding to the omnidirectional video, and the surface of the 3D geometry is mapped in the region.

10. The method of claim 8, wherein, when the 3D geometry corresponds to a sphere:
the metadata further comprises information for an area on the omnidirectional video which is mapped to the region, and
the information for the area on the omnidirectional video comprises a starting pitch angle, a starting yaw angle, an ending pitch angle, and an ending yaw angle to specify the area.

11. The method of claim 8, wherein, when the 3D geometry corresponds to a cylinder:
the metadata further comprises information for an area on the omnidirectional video which is mapped to the region,
the information for the area on the omnidirectional video comprises information indicating which surface of the cylinder the area corresponds to, and
the information for the area on the omnidirectional video further comprises a starting yaw angle, an ending yaw angle, a starting height, and an ending height to specify the area when the information indicates a side.

12. The method of claim 8, wherein, when the 3D geometry corresponds to a cube:
the metadata further comprises information for an area on the omnidirectional video which is mapped to the region, and
the information for the area on the omnidirectional video comprises information indicating a surface of the cube the area corresponds to, a coordinate to specify a position of the area on the surface, a width of the area, and a height of the area.

13. The method of claim 8, wherein, when the 3D geometry corresponds to a platonic solid having a triangular surface:
the metadata further comprises information for an area on the omnidirectional video which is mapped to the region, and
the information for the area on the omnidirectional video comprises information indicating a triangle of the platonic solid the area corresponds to, orientation information of the triangle, a coordinate to specify a position of the area on a surface, a width of the area, and a height of the area.

14. A transmission apparatus for transmitting metadata related to an omnidirectional video, the apparatus comprising:
a transceiver; and
at least one processor coupled to the transceiver,
wherein the at least one processor is configured to:
identify a planar video projected from the omnidirectional video and the metadata, and
transmit data for the planar video and the metadata,
wherein the metadata comprises information on regions defined on the planar video and type information of a three dimensional (3D) geometry for the omnidirectional video,
wherein the information on the regions defined on the planar video comprises information on a location of each of the regions on the planar video, information on a width of each of the regions, information on a height of each of the regions, and information on a number of the regions,
wherein the information on the location of each of the regions on the planar video indicates a horizontal coordinate and a vertical coordinate of an upper left corner of each of the regions on the planar video, and
wherein, when the 3D geometry comprises a squished sphere:
the metadata further comprises top pitch angle information of the squished sphere, bottom pitch angle information of the squished sphere, top squishing ratio information of the squished sphere, and bottom squishing ratio information of the squished sphere, and information for an area on the omnidirectional video which is mapped to the region, and
the information for the area on the omnidirectional video comprises a starting pitch angle, a starting yaw angle, an ending pitch angle, and an ending yaw angle to specify the area.

15. A reception apparatus for receiving metadata related to an omnidirectional video, the apparatus comprising:
a transceiver; and
at least one processor coupled to the transceiver,
wherein the at least one processor is configured to:
receive data for a planar video projected from the omnidirectional video and the metadata, and
render the data based on the metadata,
wherein the metadata comprises information on regions defined on the planar video and type information of a three dimensional (3D) geometry for the omnidirectional video,
wherein the information on the regions defined on the planar video comprises information on a location of each of the regions on the planar video, information on a width of each of the regions, information on a height of each of the regions, and information on a number of the regions,
wherein the information on the location of each of the regions on the planar video indicates a horizontal coordinate and a vertical coordinate of an upper left corner of each of the regions on the planar video, and
wherein, when the 3D geometry comprises a squished sphere:
the metadata further comprises top pitch angle information of the squished sphere, bottom pitch angle information of the squished sphere, top squishing ratio information of the squished sphere, and bottom squishing ratio information of the squished sphere, and information for an area on the omnidirectional video which is mapped to the region, and
the information for the area on the omnidirectional video comprises a starting pitch angle, a starting yaw angle, an ending pitch angle, and an ending yaw angle to specify the area.

* * * * *